US011264917B2

(12) United States Patent
Frampton et al.

(10) Patent No.: US 11,264,917 B2
(45) Date of Patent: Mar. 1, 2022

(54) INTERLEAVED INVERTER

(71) Applicant: Kohler Co., Kohler, WI (US)

(72) Inventors: Isaac S. Frampton, Strattanville, PA (US); Adam Larson, Mequon, WI (US)

(73) Assignee: Kohler Co., Kohler, WI (US)

(*) Notice: Subject to any disclaimer, the term of this patent is extended or adjusted under 35 U.S.C. 154(b) by 40 days.

(21) Appl. No.: 16/712,263

(22) Filed: Dec. 12, 2019

(65) Prior Publication Data

US 2021/0184596 A1  Jun. 17, 2021

(51) Int. Cl.
*H02M 7/537* (2006.01)
*H02M 7/48* (2007.01)
*H02M 7/493* (2007.01)
*H02M 1/00* (2006.01)

(52) U.S. Cl.
CPC ......... *H02M 7/493* (2013.01); *H02M 1/0043* (2021.05); *H02M 7/4807* (2013.01); *H02M 7/537* (2013.01)

(58) Field of Classification Search
CPC .... H02M 7/493; H02M 7/4807; H02M 7/537; H02M 1/0043; H02M 1/32
See application file for complete search history.

(56) References Cited

U.S. PATENT DOCUMENTS

| | | | |
|---|---|---|---|
| 5,408,404 A | 4/1995 | Mitchell | |
| 9,385,632 B2 | 7/2016 | Hu | |
| 9,467,063 B2 | 10/2016 | Krein | |
| 9,559,591 B2 | 1/2017 | Hang | |
| 9,600,062 B2 | 3/2017 | Kumar | |
| 9,755,521 B2 | 9/2017 | Cai | |
| 10,008,918 B2 | 6/2018 | Wibowo | |
| 10,044,255 B2 | 8/2018 | Sreenivas | |
| 10,198,020 B2 | 2/2019 | Cai | |
| 10,224,805 B1 | 3/2019 | Young | |
| 10,432,093 B2 | 10/2019 | Cheng | |
| 2014/0159481 A1* | 6/2014 | Berger | B60L 50/51 307/10.1 |
| 2016/0329811 A1 | 11/2016 | Du | |
| 2017/0189983 A1 | 7/2017 | Manthe | |

(Continued)

FOREIGN PATENT DOCUMENTS

| | | |
|---|---|---|
| CN | 106849727 A | 6/2017 |
| CN | 108768173 A | 11/2018 |

(Continued)

OTHER PUBLICATIONS

Jeannin et al., Fault Tolerant 24 KVA Interleaved Inverter, ECCE, 2012 IEEE, Sep. 15, 2012, pp. 1733-1738 (Year: 2012).*

(Continued)

*Primary Examiner* — Jue Zhang
(74) *Attorney, Agent, or Firm* — Lempia Summerfield Katz LLC

(57) ABSTRACT

A system and method for an interleaved inverter including a set of module circuits and an inverter controller. The module circuits include multiple switches. The inverter controller is configured to assign a first phase shift value to each of the module circuits during a normal mode of operation and assign a second phase shift value to at least one of the module circuits during a failure mode of operation. The second phase shift value is greater than the first phase shift value.

18 Claims, 13 Drawing Sheets

(56) References Cited

U.S. PATENT DOCUMENTS

| | | | |
|---|---|---|---|
| 2017/0366079 A1* | 12/2017 | Bhowmik | ............... H02J 3/46 |
| 2019/0052169 A1 | 2/2019 | Bhandarkar | |
| 2021/0028705 A1* | 1/2021 | Ishikura | ............... H02M 1/32 |

FOREIGN PATENT DOCUMENTS

| | | |
|---|---|---|
| CN | 108768174 A | 11/2018 |
| CN | 110518587 A | 11/2019 |
| JP | 2011522505 A | 7/2011 |
| KR | 101850468 B1 | 4/2018 |

OTHER PUBLICATIONS

Vujacic, Marija, et al. "Analysis of dc-Link Voltage Switching Ripple in Three-Phase PWM Inverters." Energies 11.2. Feb. 23, 2018. (pp. 1-14).

European Search Report issued in related Application No. EP 20209982.6 dated Apr. 20, 2021 (12 pages).

Gleissner Michael et al.: "Design and Control of Fault-Tolerant Nonisolated Multiphase Multilevel DC-DC Converters for Automotive Power Systems", IEEE Transactions on Industry Applications, vol. 52, No. 2, Mar. 1, 2016, pp. 1785-1795.

Guepratte K, et al.: "Fault tolerance on interleaved inverter with magnetic couplers", Applied Power Electronics Conference And Exposition (APEC), IEEE, Feb. 21, 2010, pp. 1817-1824.

Mondal Gopal et al.: "Modular parallel interleaved converter for high current application", 2016 IEEE 17th Workshop on Control and Modeling for Power Electronics (COMPEL), IEEE, Jun. 27, 2016, pp. 1-8.

Park Kiwoo, et al.: "Open-circuit fault detection and tolerant operation for a parallel-connected SAB DC-DC converter", 2014 IEEE Applied Power Electronics Conference and Exposition (APEC), Mar. 16, 2016 pp. 1966-1972.

Pierre-Olivier Jeannin, et al.: "Fault tolerant 24 KVA interleaved inverter" Energy Conversion Congress and Exposition (ECCE), 2012 IEEE, Sep. 15, 2012, pp. 1733-1738.

* cited by examiner

INTERLEAVED INVERTER

FIELD

This application relates to the field of power conversion circuits for power transfer from an input source to an output load.

BACKGROUND

A power converter may perform a variety of functions, including conversion between different types of electrical power, such as direct current (DC), single-phase alternating current (1-phase AC) and three-phase alternating current (3-phase AC) or different frequencies (such as 50 Hz, 60 Hz or 400 Hz). A power converter May also adjust the level of one or more characteristics of electrical power, such as a voltage amplitude or equivalent amplitude or a current amplitude or equivalent amplitude.

Power converters may fall into various categories, two of which are switching and linear power supplies. A switching power supply may switch a current through various paths at various times through an operational cycle. The switching of the current may produce a ripple in the current. A switching power supply may selectively apply a voltage between two references. Selectively applying the voltage between the two references may result in a ripple or fluctuation in an output voltage. The current ripple and voltage ripple may be undesirable.

BRIEF DESCRIPTION OF THE DRAWINGS

Exemplary embodiments are described herein with reference to the following drawings.

DETAILED DESCRIPTION

Figure 1:
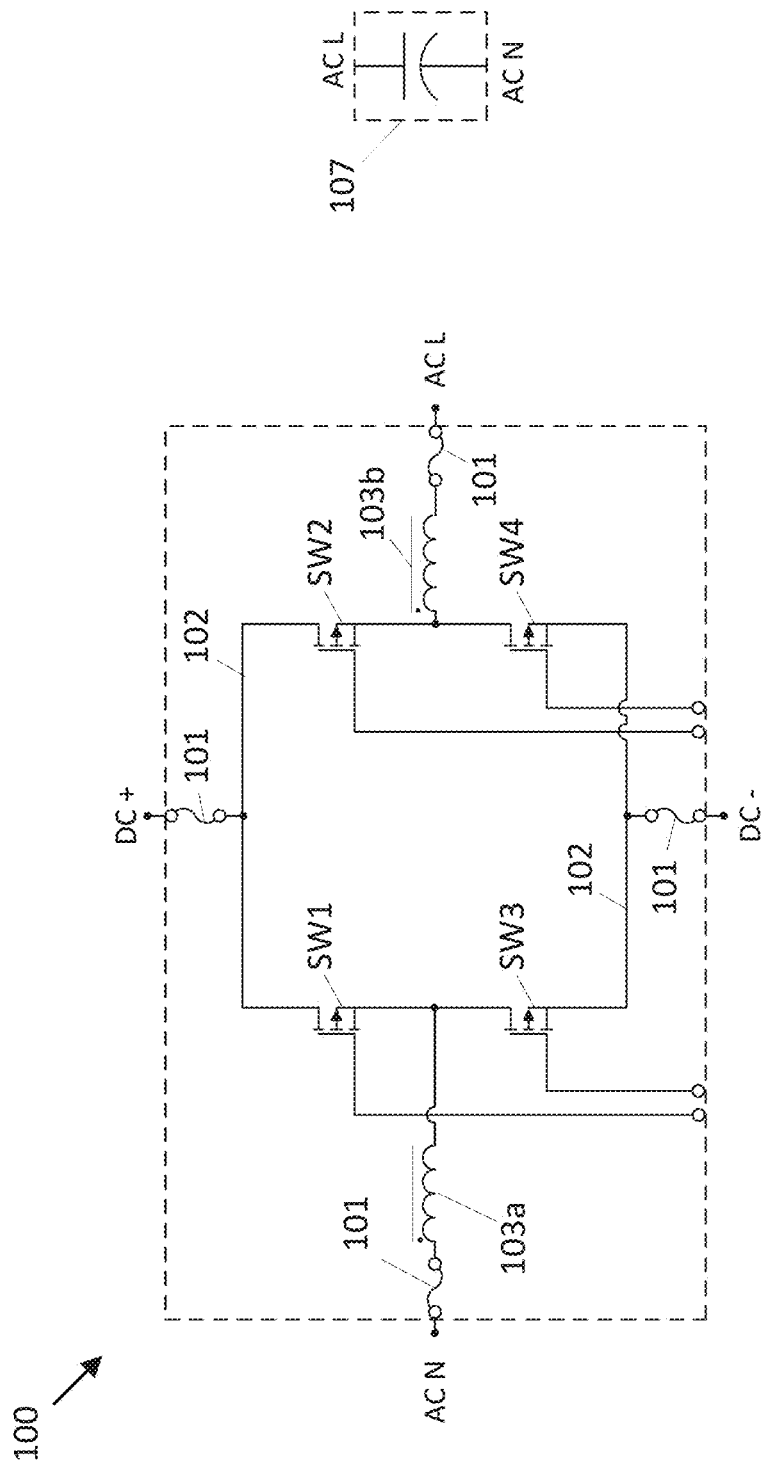
FIG. 1 illustrates an example module of an H-bridge circuit including inductive elements.

The following embodiments include a bi-directional power converter for converting direct current (DC) into alternating current (AC), commonly and hereafter referenced as an inverter. Specifically, an interleaved inverter including switching modules operating in an interleaved fashion to transfer power from an input source to an output load. The switching modules are connected in parallel with each other and at least one common circuit element. Power transfer may be bidirectional. In some examples, the input source includes a direct current (DC) source such as a battery, a solar array, a fuel cell, an AC-DC converter or another source. The input source may be charged, connected to, or otherwise associated with a utility or a power generator such as an engine-generator set (genset), a wind turbine, a hydroelectric turbine, or another device that converts mechanical energy to electrical energy. The genset may include an alternator coupled to an engine, as described in more detail below. The output of the interleaved inverter may be an alternating current (AC) signal.

The output currents of the switching modules are shifted in time and added together by the parallel connection of the modules to create the output signal. The switching modules may operate at a lower frequency than the output but still generate the high frequency of the output. The switching frequency may be less than the output frequency by a ratio that is determined by the number of modules. Thus, four modules may allow the switching frequency to be at ¼ of the output frequency. Any number of interleaved modules may be used. For examples, 20 modules at 100 kHz may provide an effective output frequency of 2 MHz. Such a high frequency output may require only a small capacitor for the output filter, which simplifies the circuitry (e.g., lower cost, fewer components).

As one possible result, the components of the switching modules have a lower cost. With lower frequency modules, the components of the switches may be lower rated and less costly. In addition, components may run at lower temperature and require less ventilation or other cooling techniques when implemented. Efficiency of power conversion may also be improved with a lower switching frequency.

As another possible result, losses are reduced and the efficiency of the system improves when the same components are used. That is, if the output frequency is maintained as the switching frequency, the efficiency is increased because the output is the combined output of each module, while the individual modules each switch ¼ as often, reducing switching losses, which are often directly related to the switching frequency.

Another benefit of the interleaved inverter relates to protection of the underlying circuits. When the switches have a negative temperature coefficient, as is the case with some insulated-gate bipolar transistors (IGBTs), the forward voltage decreases with increasing temperature. These switches are thermally stable and losses are reduced with increased temperature. However, when two of these types of switches are connected in parallel, problems may arise. One of the parallel switches under increased temperature, has lower voltage across it and more current flows through the switch. With more current, the switch experiences more increased temperature, and the cycle repeats. Eventually, this switch may overheat with the parallel switch barely carrying any of the current. However, in the interleaved inverter topology, the output of the switches are effectively connected in parallel but the intervening inductor between the modules reduces the effect of changing temperature on the distribution of current between the switches.

As an example, two parallel switches in an H-bridge switching a 400V DC bus may have different switch temperatures such that a first switch has a temperature that would require a voltage drop of 1.7V to flow a 20 A current through the switch, while a second switch has a temperature which would require 2.2V drop to flow a 20 A current flowing through the switch. If the two switches are connected directly in parallel, the current through the switches may be 35 A through the first switch, giving a 2.0V drop across the first switch and 5 A through the second switch, giving a 2V drop across the second switch. At this difference in current, the first switch is dissipating 70 W and the second switch is dissipating 10 W, causing the first switch to operate at the much higher temperature and continuing the difference in current through the switches.

In contrast to the H-bridge with the switches connected directly in parallel, interleaved H-bridges may provide better temperature stability. As an example using the example switches above, a first H-bridge composed of switches at the temperature of the first switch will provide 400−1.7V−1.7V=396.6V across the output inductor, while a second H-bridge with switches the temperature of the second switch will provide 400−2.2V−2.2V=395.6V across the output inductor. Into an ohmic load, the two switches will have very similar current because they have a similar voltage (396.6−395.6=1V/400V=0.25% difference). The power dissipated by the switches in the first H-bridge will be 20 A*1.7V=34 W, while the power dissipated by the switches in the second H-bridge will be 20 A*2.2V=44 W. so the temperature of the switches will tend to equalize.

Each interleaved H-bridge may be driven with a matching signal, a phase shifted signal, a discontinuous signal, or another signal to operate the H-bridge. The H-bridges may be operated by a controller that monitors current output from the combined interleaved inverter. The H-bridges may be operated to control current independently. The H-bridges may be operated as a combined system to control an output voltage to a target. The H-bridges may be operated independently to control an output voltage to a target. Combinations of these control strategies or other control strategies are possible to equalize temperature of switching elements or to match loading between elements of an interleaved inverter.

In addition to current sharing concerns, interleaving switches may also help to reduce deviation in switch temperature due to differences in switching speed due to inherent component characteristics and temperature. Switching parallel devices may result in a single switch turning on before the others or off after the others, potentially resulting in an overload of the device, but interleaved switches may not experience this undesirable condition because each switch has only the current for a single switch available to it due to the output inductor 103.

The switching modules may be centrally controlled such that a single device monitors all the switching modules and/or provides control signals to the switching modules. When one of the switching modules experiences a failure or is taken offline (e.g., disconnected from the output load or the input source), the central control device may adjust control of the remaining switching modules. For example, the output current or power of the other switching modules may be increased to account for the lost power from the disconnected switching module. Alternatively, one or more parameters may be adjusted in the switching modules to account for the transition to fewer switching modules. Thus, the central control device detects or causes the disconnection of one of the switching modules and controls at least one other switching modules in response to the disconnection.

A fuse may be connected in series with one or more switching modules (e.g., circuit elements comprised in the one or more switching modules), electrically connected to a source of current, in order to protect the circuit element from an overcurrent, or a current in excess of a predetermined threshold, that may be provided by the source of current and/or an external source. The fuse may include a conductor (e.g., a thin strip of metal) configured to melt or otherwise be physically transformed to stop the overcurrent from passing through the circuit element. When the fuse blows, an open circuit is created between the circuit element and the source of current. The fuse is an example of an electrical isolator or a circuit disconnecting device between the source of current such as a DC bus and at least one of the switching modules. Other examples of circuit disconnecting devices include circuit breakers, vacuum fault interrupters, relays, semiconductor switches, manually operated contacts, drawout contact systems, connectors, among other disconnecting devices, In some embodiments, as an alternative to blown fuses, certain failure scenarios may involve a module that is partially functional. Rather than a detection of a blown fuse, the partially functional module may be identified by analysis of the output (e.g., current trace) of the switching module. The control circuitry may choose to disconnect the module, to continue to operate it in a limited capacity, or to perform another fallback action related to the failure.

FIG. 1 illustrates an example module circuit 100 of an H-bridge including at least one fuse 101, at least one switch SW1, SW2, SW3, SW4, and at least one inductive element 103. The module circuit 100 may be an inverter that changes direct current (DC) to alternating current (AC). Various other circuit topologies are available to perform this function. The H-bridge topology includes a predetermined number of switches arranged in an H-shape. The switches of the inverter circuit are controlled to produce a specific output, which may be a periodic function (e.g., triangle wave, square wave, sine wave, or approximation thereof) at a predetermined frequency for the AC signal. The inverter circuit may drive a load, including a load circuit. The module circuit 100 may be referred to as a modular inverter circuit or a modular H-bridge circuit.

Specifically, the module circuit 100 circuit may include four switches SW1, SW2, SW3, and SW4 connected to a power supply rail 102 (DC link or DC bus), and an output (AC output). The voltage of the power supply rail 102 is connected to a power supply (e.g., source or voltage source). From a circuit topology perspective, the switches are arranged in a first side, including SW1 and SW3 and a second side, including SW2 and SW4. An inductor 103a is connected between a first side pair of switches SW1 and SW3 and an inductor 103b is connected between a second side pair of switches SW2 and SW4. Through alternative switching between the first side pair of switches and the second side pair of switches the DC power supply to the module circuit 100 is inverted into an AC output. The output of the module circuit 100 provides an AC signal through an AC L line terminal and an AC N neutral terminal. Outside of module 100, the AC output may be connected to an output filter, which may include capacitor 107 connected between the AC L line terminal and the AC N neutral terminal. As discussed in more detail herein, there may be multiple module circuits 100 connected in parallel and connected to the same output filter or capacitor 107. Additional, different or fewer components may be included.

Each of the switches may be composed of a single device, such as a field effect transistor (FET) or an insulated-gate bipolar transistor (IGBT), or multiple devices in a common package, such as a combined FET and body diode or a combined IGBT and body diode. The switch may be composed of multiple devices connected in series, such as two FETs or two IGBTs. Greater than two devices may be connected in series, the series connection may include steering devices and energy storage or dissipative elements to equalize voltage across the switches. The switch may be composed of multiple devices connected in parallel similarly to the parallel-connected FETs and the parallel-connected IGBTs. The switch may be composed of a parallel combination of a FET and an IGBT or a combination of one or more IGBTs and one or more FETs connected in parallel. The switch may be composed by a back-to-back combinations of FETs or a back-to-back combination of IGBTs. FETs may be simple FETs or combined FETs with body diodes. IGBTs may be simple IGBTs or combined IGBTs with body diodes. In addition, the concept of a switch that interrupts or significantly reduces current flowing through a path and is not restricted to the embodiments detailed herein.

Figure 2:
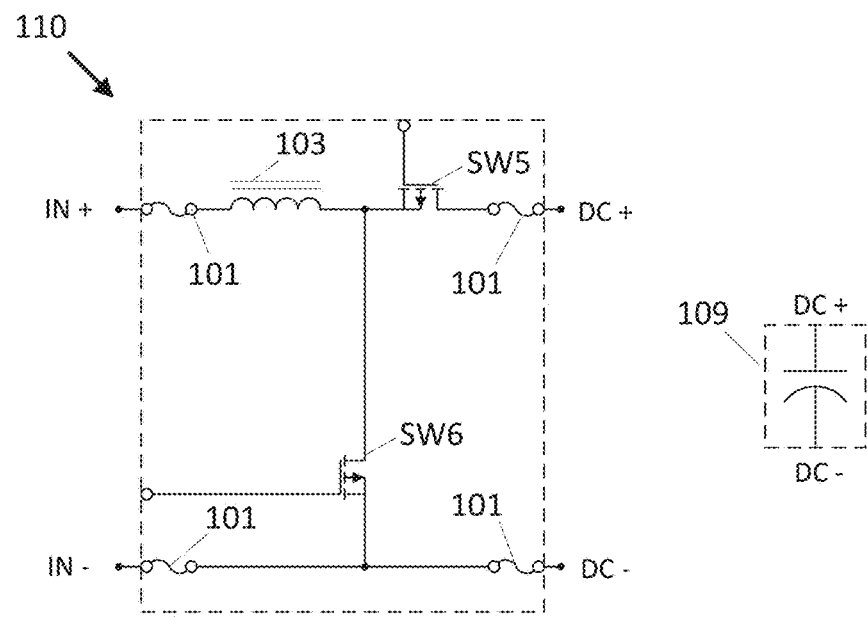
FIG. 2 illustrates an example module of a bidirectional boost converter including inductive elements.

FIG. 2 illustrates an example module circuit 110 including a bidirectional boost converter including at least one fuse 101, at least one switch SW5, SW6, and at least one inductor 103. The module circuit 110 may a DC-DC converter that receives an input signal at a first voltage and converts it to an output signal at a second voltage (e.g., the second voltage is greater than the first voltage). In addition, the input signal may be stepped down from a first current to a second current at the output signal (e.g., the second current is less than the first current). The output signal may be connected to a DC link capacitor 109 (e.g., a filtering capacitor or storage capacitor) to limit fluctuations in the DC output of the bidirectional boost converter.

It may be desirable to reduce the ripple of current into the DC Link Capacitor 109 or to reduce the voltage ripple seen on the DC Link Capacitor 109. This reduction may be accomplished by interleaving multiple module circuits 110 from a single input source to a common DC link capacitor 109.

Figure 3:
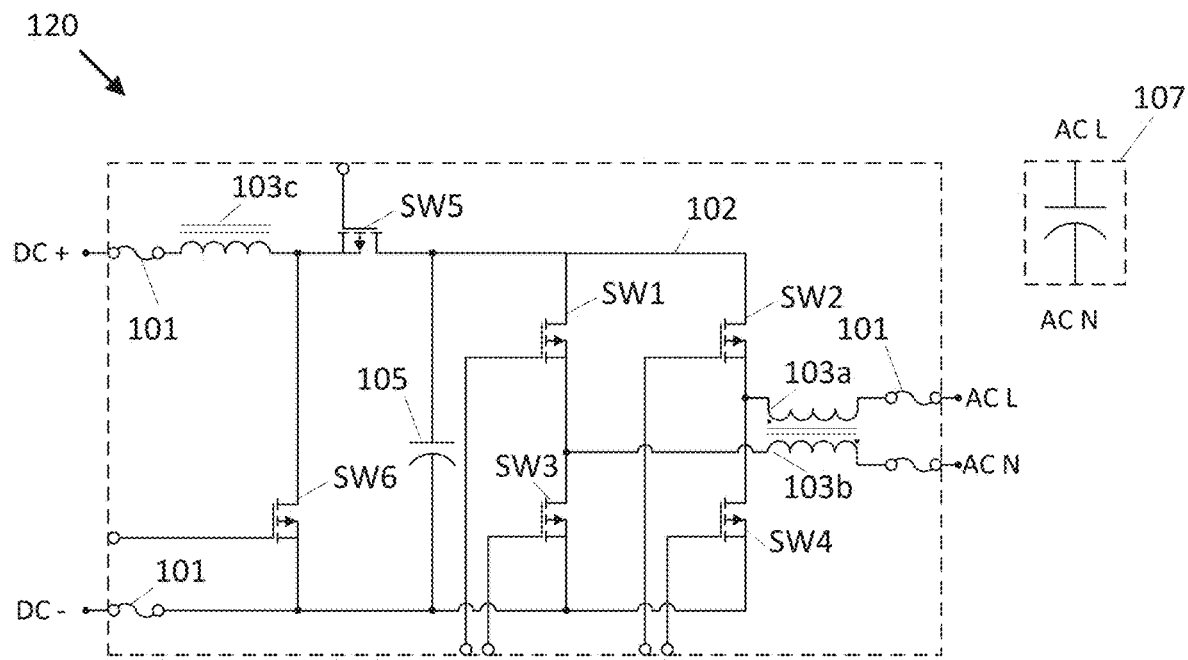
FIG. 3 illustrates an example module of a combined H-bridge circuit and bidirectional boost converter including inductive elements.

FIG. 3 illustrates an example module 120 of a combined H-bridge circuit and bidirectional boost converter including inductive elements 103. The output of the bidirectional boost converter provides the power supply rail 102, stabilized by a DC link capacitor 105 for the H-bridge circuit. In combined H-bridge circuit and bidirectional boost converter of FIG. 3, one or more of the fuses 101 are connected to the input of the bidirectional boost converter and one or more of the fuses 101 are connected to the output of the H-bridge circuit.

The internal DC link capacitor 105 in FIG. 3 helps to reduce ripple in the DC signal provided from the bidirectional boost converter to the H-bridge circuit and may also provide energy storage to allow the H-bridge elements to source or absorb reactive power. In the following embodiments, the capacitor 105 may be an element that experiences a failure, causes the respective module to be removed or disconnected, from the interleaved inverter. Embodiments where modules do not contain this DC link capacitor 105 or where the DC link capacitor 105 is independently replaceable are contemplated by this design.

Figure 4:
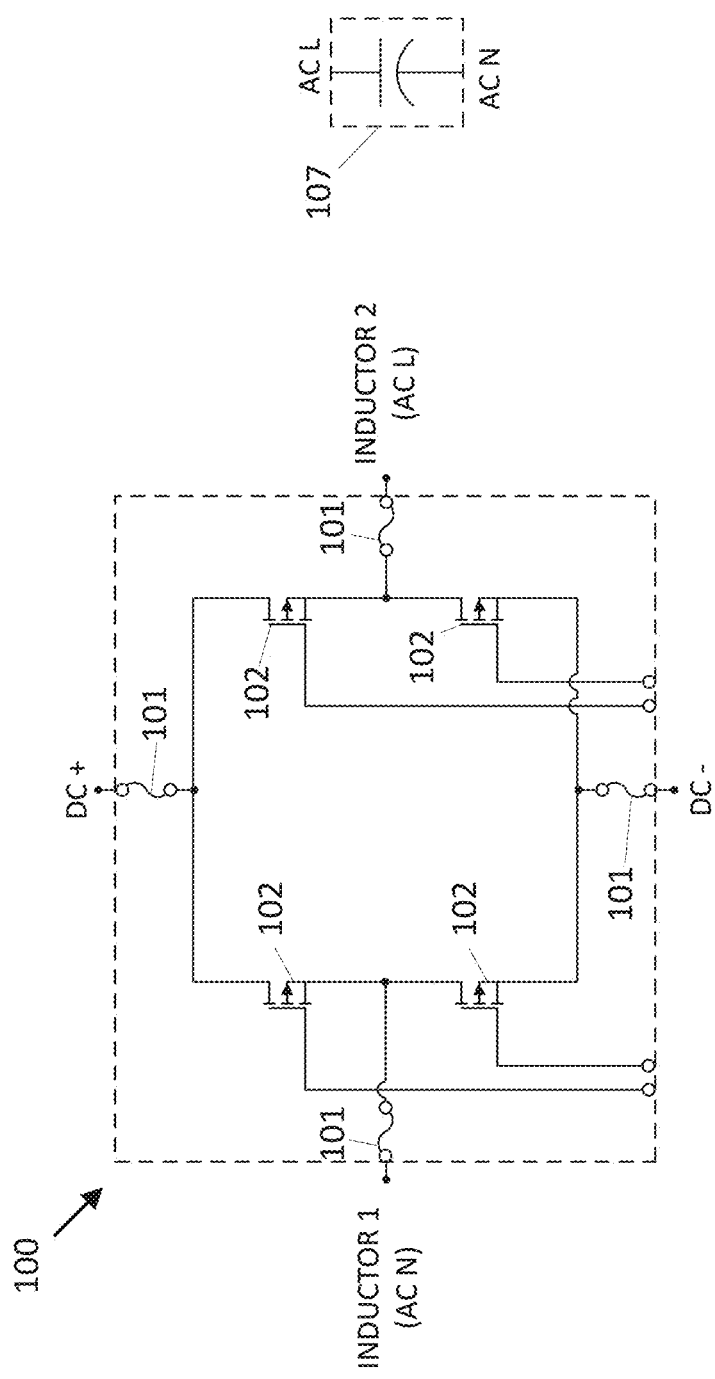
FIG. 4 illustrates an example module of an H-bridge circuit including fuses.
Figure 5:
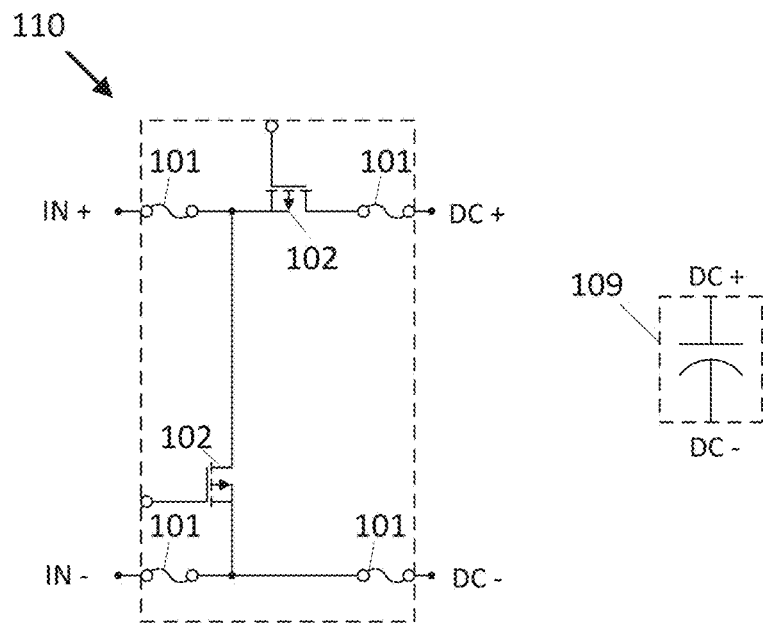
FIG. 5 illustrates an example module of a bidirectional boost converter including fuses.
Figure 6:
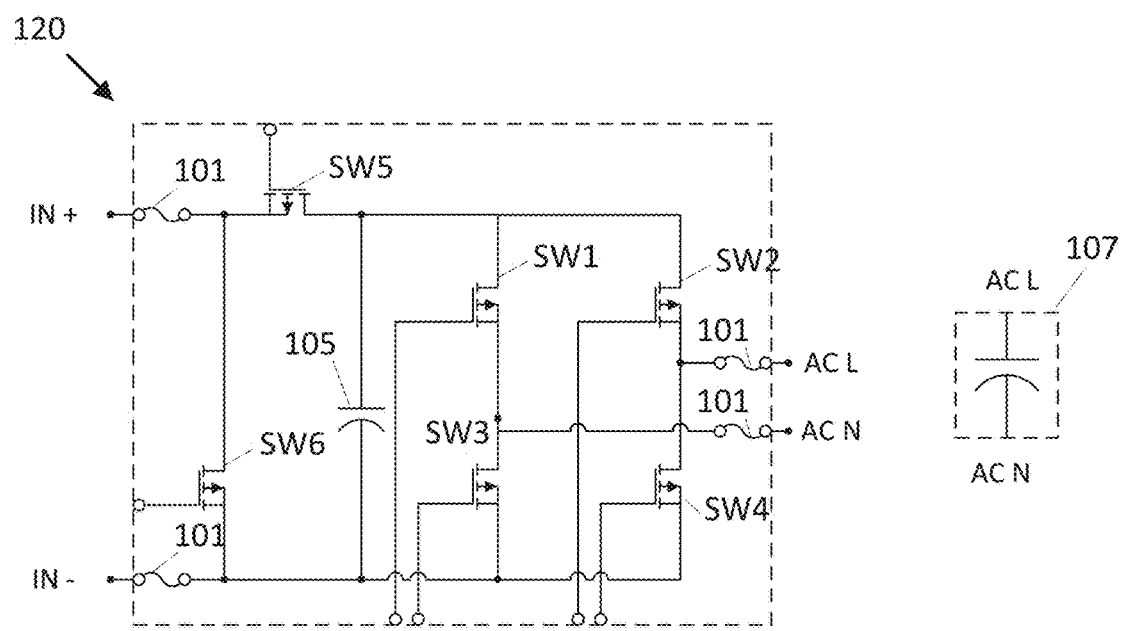
FIG. 6 illustrates an example module of a combined H-bridge circuit and bidirectional boost converter including fuses.

FIGS. 4-6 illustrate another embodiment of the circuits of FIGS. 1-3 modified so that the inductors 103 are outside of the modular circuits. That is, the modular circuits of FIGS. 4-6 are removable independent of inductors 103. FIG. 4 illustrates an example module of an H-bridge circuit. FIG. 5 illustrates an example module of a bidirectional boost converter. FIG. 6 illustrates an example module of a combined H-bridge circuit and bidirectional boost converter including internal DC link capacitor 105.

Figure 7:
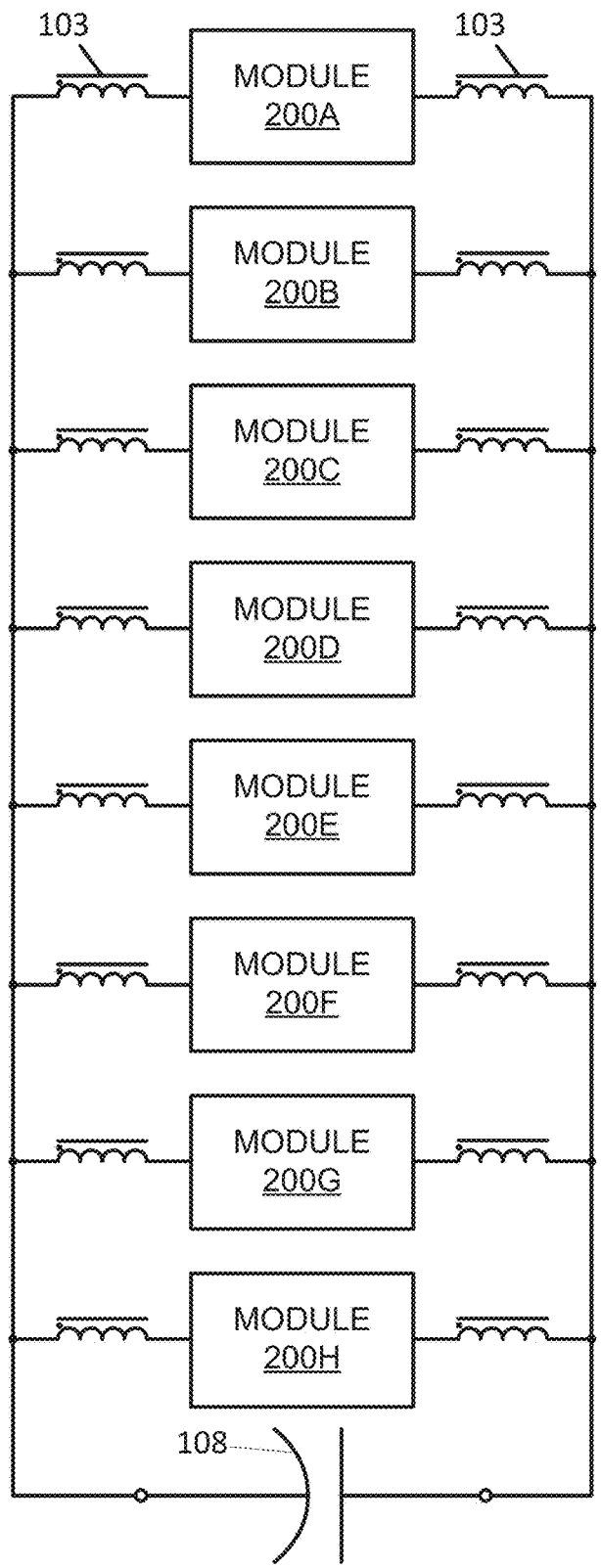
FIG. 7 illustrates circuitry of an example system including multiple modules according to any of the examples in FIGS. 1-6.

Regardless of whether the inductors 103 are external as shown in FIGS. 4-6 or internal as shown in FIGS. 1-3, the inductors for each of the module circuits are coupled to at least one terminal of a common filter element, as shown in FIG. 7.

FIG. 7 illustrates an example system including multiple modules according to any of the examples in FIGS. 1-6 including a common capacitor 107 or common filter element. The common filter element is coupled to each of the module circuits 200 and configured to reduce the electrical ripple output from the module circuits 200. The AC filter capacitor 108 is an example of the common filter element. Alternatively, the common filter element may be the DC link capacitor 109.

Figure 8:
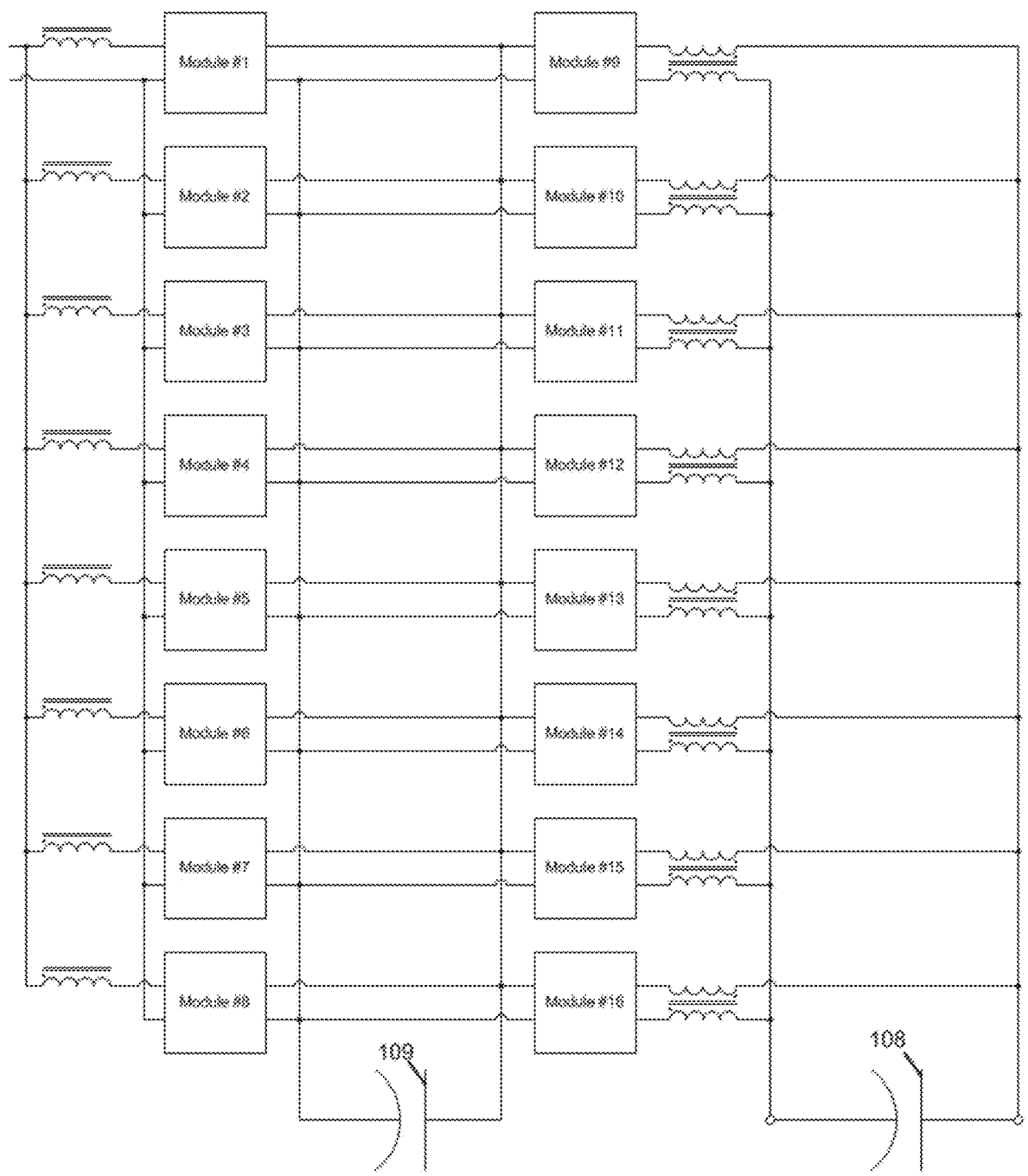
FIG. 8 illustrates circuitry of another example system including multiple modules according to any of the examples in FIGS. 1-6.

FIG. 8 Illustrates an example system including multiple modules according to any of the examples in FIGS. 1-6, specifically illustrating a combination of the modules of FIG. 4 and FIG. 5. Modules 1-8, representing bi-directional boost converter modules 110 from FIG. 5 are interleaved, fed through inductors 103c and feeding a DC link capacitor 109 as the common filter element. The combined DC bus input to modules 9-16, representing H-bridge modules 100 from FIG. 4 is supplied from the DC link capacitor 109 which is also connected to the combined output of the bi-directional boost converters 110. The output from the H-bridge modules 100 is combined in AC output capacitor 108 as the common filter element through inductors 103a and 103b.

Figure 9:
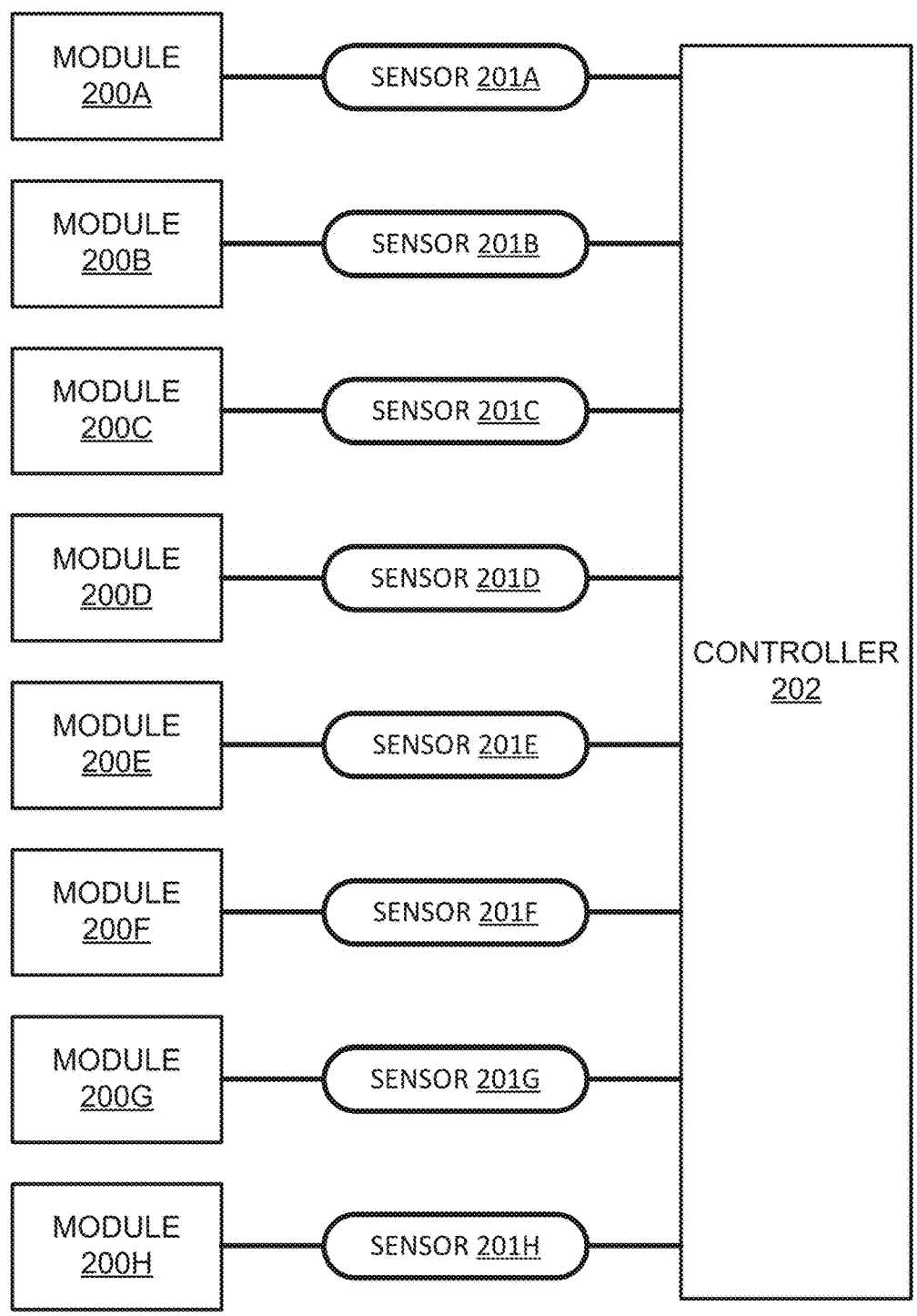
FIG. 9 illustrates an example system including multiple modules and a central controller for the system of FIG. 7.

FIG. 9 illustrates an example system including multiple modules 200A-G, referred to collectively or individually as modules 200 and a central controller 202. The controller may be a microprocessor, a microcontroller, an applications specific integrated circuit The modules may be all of the same type or different types. The modules 200 may be H-bridge modules 100, as shown in FIGS. 1 and 4, boost converter modules 110, as shown in FIGS. 2 and 5, and/or combined H-bridge circuit and bidirectional boost converter modules 120, ad shown in FIGS. 3 and 6. The controller 202 is configured to select a timing control for the switches of the module. The controller 202 may generate pulse width modulation signals for the switches. The width of the pulses may correspond to the duty cycle of the switches. The controller 202 may selectively disable or remove modules 200 based on information from the sensors 201. Additional, different, or fewer components may be included.

Figure 10:
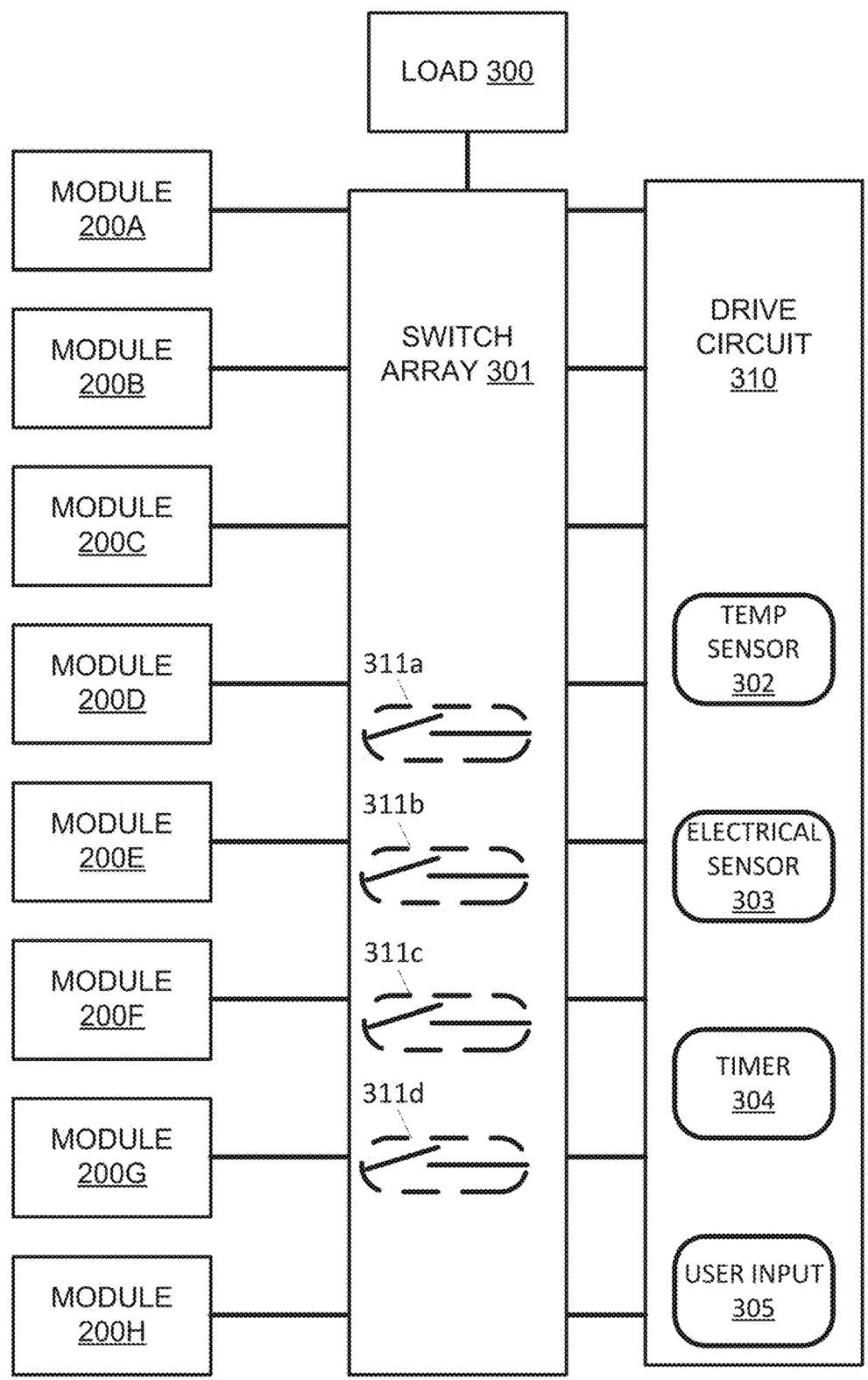
FIG. 10 illustrates an example system including a drive circuit and switch array for the system of FIG. 7.

FIG. 10 illustrates another example system including a drive circuit 310 and switch array 301. Different types of switches may be used. All of the switches in the array 301 may be the same types or different types. Example switches include mechanical switches 311a including at least one throw for making an electrical connection between the module and the interleaved inverter, electronic switches 311b that make or break the electrical connection on a printed circuit board or integrated circuit, or magnetic switches 311c that makes or breaks the electrical connection when a magnetic field is applied to the magnetic switch. The magnetic field may be controlled by the drive circuit 310, or controller 202. In some examples, the switch and sensor may be combined in a single device such as a thermocouple 311*d*. The thermocouple 311*d* may be open at one temperature range and closed at another temperature range such that the thermocouple only connects the associated module to the interleaved inverter when the ambient temperature is within the specified range. The thermocouple may be a thermofuse.

In the example of FIG. 10, the control of the switch array 301 is implemented by the drive circuit 310, which may include sensors or other devices for generating data and measuring characteristics upon which the switch control is based. Example subcircuits or sensor circuits may include temperature sensor 302, electrical sensor 303, timer 304, and/or user input 305. The temperature sensor 302 may monitor an environment of the module and provides an output signal indicative of the temperature of the environment. The electrical sensor 303 may include circuitry for detecting voltage, current, or another electrical characteristic for the output of the module 200. The timer 304 may set a predetermined time period or time window for measuring with another of the sensing circuits. The timer 304 may set a time window for replacement of the module 200. The user input 305 may include circuits for receiving an input (e.g., button depress, change in dip switch) by the user. Even without a controller, the drive circuit 310 provides an example where performance is measured and the switches 311 are directly actuated in response to the measured data. The following example discussed in regard to the controller 202 may be implemented using the drive circuit 310 and one or a combination of the temperature sensor 302, electrical sensor 303, timer 304, and/or user input 305.

In general, the nature of the connective structure for modules 200A-G in combination with the fuses 101, or controller based activation/deactivation, allow the interleaved inverter to isolate a given module from the DC and AC side of the circuit to allow continued operation even when a failed module is present. Controller based activation/deactivation means that the controller 202, in addition or in lieu of fuses 101, may disconnect and/or reconnect individual modules 200 from the interleaved inverter. Efficiency and THD may change with the loss of a module.

The module commands may instruct the modules 200 to enable or disable one of multiple modes of operation. Example modes of operation include a normal mode of operation and a failure mode of operation. The failure mode of operation may include various remedial actions, which may be performed together or as alternatives, and include a load shedding mode, a sacrificial mode of operation, a peak efficiency mode of operation, a module replacement mode and other modes. In each example, the controller 202 may perform a phase shift sequence in response to the failure mode. The modes may be performed concurrently. The controller 202 may select and implement a mode in response to user inputs or the sensor data.

The modules 200 under the control of controller 202 may generate AC output signals that are combined to form a system output. The individual outputs of the modules 200 may be added together to form the system output as a consequence of the outputs of the modules 200 being electrically connected in parallel. As discussed in more detail herein, the outputs of the modules 200 may include substantially similar sinusoidal signals that are shifted in time or that exhibit ripple characteristics that are shifted in time with a fundamentally similar primary throughput current. At any point in the system output of the interleaved inverter, the module outputs are combined at their respective phase shifted positions. The controller 303 actively sets these phase shift positions to achieve a desired system output.

The system may include one or more sensors 201A-G, referred to collectively or individually as sensors 201, that correspond to respective ones of modules 200A-G and are electrically coupled to the controller 202. The sensors 201 may be a variety of types of sensors that detect a failure in the modules 200. The sensor 201 is configured to generate sensor data for an electrical parameter of at least one of the modules 200. The controller 292 is configured to receive the sensor data and detect a failure or a disconnection of at least one of the modules 200. The disconnection may be intentional (e.g., user initiated) or unintentional (e.g., component failure).

A fuse sensor may detect the operation of the fuses 101. The fuse sensor may detect whether the fuse 101 is conducting current, which is indicative of whether the fuse 101 is blown. The fuse sensor is one type of electrical sensor. Other types of electrical sensors may include a voltage sensor, a current sensor, or an inductive sensor.

The sensors 201 may be embodied as separate devices that connect to the modules 200. Alternatively, the controller 202 may include circuitry that detects the operation of the module 200 in place of the sensors 201. The sensors 201 generate sensor data indicative of the operation of the fuses 101 and/or the module 200. The sensors 201 may reside on the modules 200 and communicate signals back to the controller 202 using some type of communication bus.

The controller 202 (inverter controller) may be configured to generate module commands and send the module commands to the modules 200. The module commands may be addressed to specific module using a module address (e.g., network address for the communication network between the controller 202 and the modules 200) or module identifier in the module command. Alternatively, the module commands may be signal sent directly to the modules 200 based on predetermined communication paths (e.g., the controller may have individual outputs or output pins or connections that correspond to each of the modules 200).

The module commands may include individual switch commands for the switches of the modules 200. The switch commands may instruct a first pair of switches (SW1, SW4) to provide a positive voltage and current to the output and another pair of switches (SW2, SW3) to provide a negative voltage and current to the output. The circuit may be controlled using pulse width modulation (PWM) such that the module command sends PWM signals to the switches. The pulse width of the PWM signal may be proportional to the amplitude of the output of the switches. That is, when the output filter smooths the PWM signal to a sinusoidal output, the longer pulses of the PWM signal correspond to the larger amplitudes of the sinusoidal output. A combined switch signal includes a first pulse width modulated signal for the first side pair of switches and a second pulse width modulated signal for the second side pair of switches. The module commands may include a first pulse width modulation signal for the normal mode of operation and a second pulse width modulation signal for the failure mode of operation.

Figure 11:
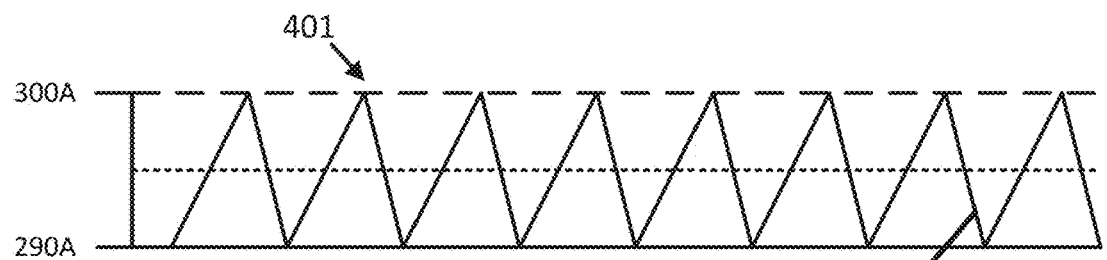
FIG. 11 illustrates an example chart for ripple in any of the examples of FIGS. 1-10 during a normal mode.

FIG. 11 illustrates an example chart for ripple current 401 feeding into the filter capacitor 109 in any of the examples of FIGS. 1-10 during normal operation. In this example, the target output current is about 295 amps. The output fluctuates, as indicated by ripple 400, between about 290 amps and 300 amps. Thus, the baseline for ripple in this example is 10 amps. The current ripple of 10 A in this example results in a THD of about 0.8%.

In the normal mode of operation, the module commands instruct the modules 200 to operate normally to generate the sinusoidal output signal. The modules 200 may generate the output signal according to a target frequency and/or amplitude. The output signal may include a ripple have a minimum level and/or maximum level for the normal mode of operation. The ripple may be determined as a function of the number of modules 200 that collaborate to generate the output signal. The normal mode of operation may not specify efficiency or specify a total harmonic distortion (THD) limit but may naturally include these characteristics.

The module commands may instruct the modules 200 to activate (be turned on) or deactivate (be turned off) according to the sensor data. For example, in the failure mode of operation, the module commands may disable the switches of a module, or at least one of the pairs of switches in a module, by turning off the switches as remedial action in response to a failure. The controller 202 may disconnect at least one of the modules 200 in response to the detected failure. Alternatively, the modules 200 may automatically disconnect. Thus, the failure mode involves a disconnection of a module, either by user intervention, circuit disconnecting device, or instruction of the controller 202.

In response to the failure mode, the controller 202 performs the phase shift sequence. The controller 202 generates module commands to cause a change in the phase shifts of the modules 200, or relative phase shifts between the modules. In normal mode, with n modules, the phase shift between the modules 200 may be 360/n. For example, with eight or more modules as shown in FIGS. 7 and 8, the phase shift between successive modules may be 40°. The controller 202 may assign this phase shift to the modules 200 in the normal mode of operation or it otherwise performed by the modules 200. In one example, the controller 202 sends a signal or message to each of the modules 200 that specifies the initial phase shift value. When entering the failure mode of operation, after the controller 202 has determined that one of the modules should be deactivated or a corresponding fuse has blown, the controller 202 may determine a new phase shift value for one or more of the modules 200. This second phase shift value is assigned to the other modules 200 (e.g., other than the failed module or removed module) in response to or in correspondence with the disconnected module.

The new phase shift value may be greater than the initial phase shift value. In this failure mode, now with n−1 modules because one has been deactivated or otherwise gone offline, the phase shift between the modules 200 may be 360/(n−1). For example, with seven remaining modules, the phase shift between successive modules may be 51.4°. Table 1 summaries possible phase shift values for the example of FIG. 7 with eight modules. As more modules 200 fail or are deactivated and no longer contribute to the output signal, the phase shift value assigned to the remaining modules increases.

TABLE 1

| 8 Modules | 45° |
| 7 Modules | 51.4° |
| 6 Modules | 60° |
| 5 Modules | 72° |
| 4 Modules | 90° |
| 3 Modules | 120° |
| 2 Modules | 180° |

Equations 1 and 2 provide a general case for the calculation of the phase shift value. The phase shift value (PSV) may be calculated based on the number of remaining modules, which is the quantity of initial modules (I) less the number of failed modules (F), using 360 as a reference.

$$PSV=360/(I-F) \quad \text{Eq. 1}$$

Equation 2 provides that calculates of the second phase shift value (SPSV) is calculated based on the first phase shift value (FPSV) according a total quantity (Q) of the plurality of module circuits and a failed number (F) of the plurality of module circuits:

$$SPSV=Q*FPSV/(Q-F) \quad \text{Eq. 2}$$

FIG. 11 illustrates an example chart for the interleaved inverter current output into the filter capacitor 108 during a failure of a module. After a switch fails open or otherwise mechanically fails (e.g., loses connection, breaks off circuit board) or loses connection to the other half of the switch. The failed pair of switches for one half of the cycle no longer operates, causing the current to continue to fall when switching that module is supposed to increase the current at time t1. In the example of FIG. 11, a switch has failed open inside a module, preventing that module from applying a positive voltage across the output inductor and increasing the output current for that module to offset the falling current from other modules.

At t2, the corresponding module is disconnected and the phase angle between the other modules is adjusted to account for the disconnected module. In the example, the interleaved inverter has been reduced from 8 modules to 7 modules, requiring a change in phase from 45° to 51.4° between the interleaved signals. At t3, the output returns to about the same average output current level, but with a slightly increased ripple.

Figure 12:
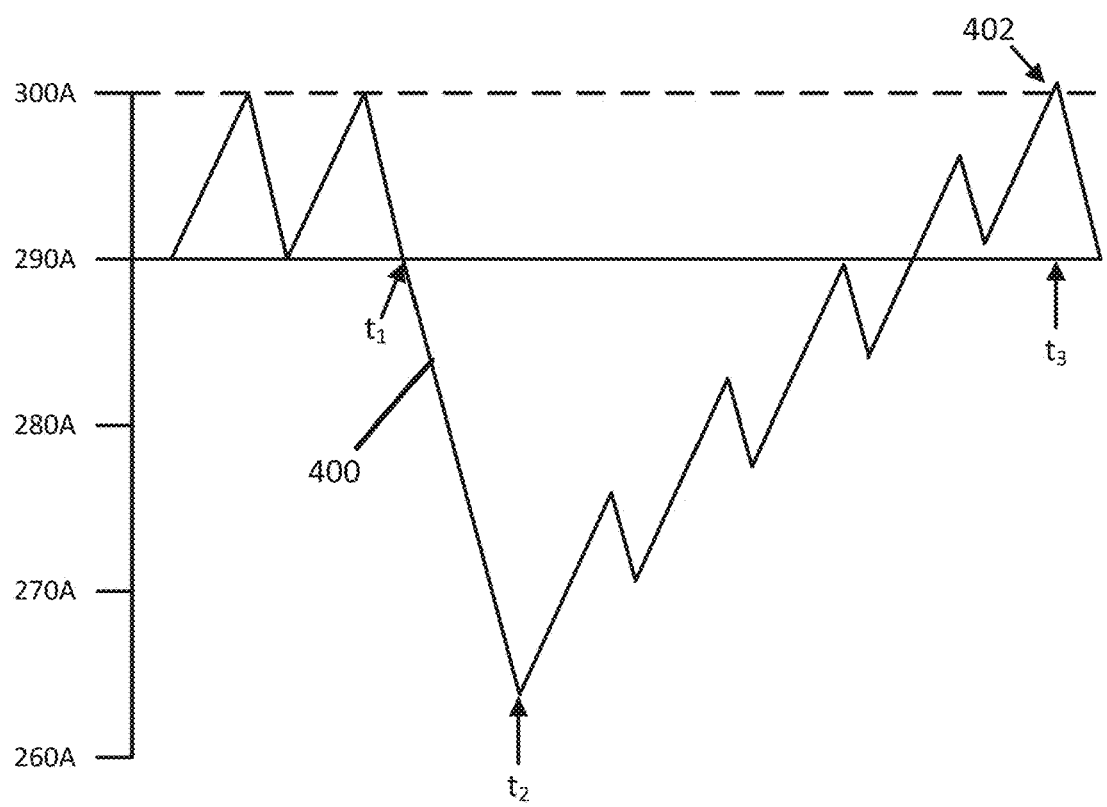
FIG. 12 illustrates an example chart for ripple during a failure mode.
Figure 13:
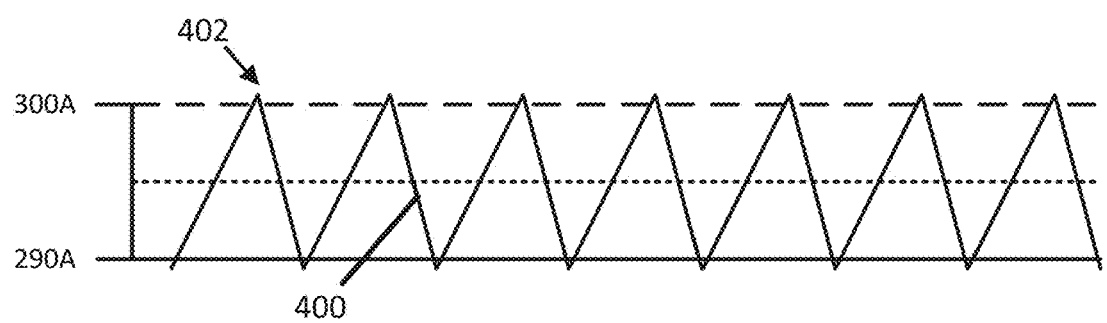
FIG. 13 illustrates an example chart for ripple during recovery from the failure mode of FIG. 9.

FIG. 13 illustrates the increased ripple for the inverter example of FIGS. 11 and 12. The phase between the switch signals has increased to 51.4° and only 7 modules operate to switch within a given period instead of the eight modules switching as shown in FIG. 11. The ripple observed in the condition of a single module failing out of eight results in an increase to about 12 A of ripple in this example, which will create a THD level of about 1% from the final interleaved inverter. In most cases, the increased current ripple and corresponding THD is acceptable, especially during failure conditions. If the condition is not acceptable, the interleaved inverter will have to be operated in a THD reduction mode.

In addition to changing the phase shift values of the remaining modules, other characteristics of the remaining modules may be changed. For example, the amplitude of the output from each module may be increased. The increase may account for the lost output from the deactivated module. Assuming that the modules are balanced (i.e., each modules was operating under the same parameters and outputting the same output), the increase of the module output in percentage is provided by the ratio of the failed number (F) of modules to the remaining quantity (Q) of modules, as shown by Equation 3:

$$\Delta=F/Q \quad \text{Eq. 3}$$

For example, if the eight modules in FIG. 9 were outputting 10 kW each during the normal mode. When one of the modules is deactivated, leaving seven modules (e.g., in the phase shift mode), each of the remaining modules is instructed to increase output by 1/7 or 14.3%. The controller 202 generates and sends one or more module commands to increase the output or provide the output of 11.43 kW. Thus, the modules of the interleaved inverter in normal mode operate below a maximum load such that full power can be maintained in the event of the failure of a module.

In some examples, the output rating of the modules may be selected considering the failure mode. That is, in the failure mode, the module run at higher power than in the normal mode. So the modules may be selected according to the potential failure mode power levels. Considering the example of 10 kW operation, the modules may be selected to operate in 13.3 kW in case two modules are deactivated. The modules may be selected to operate in a failure mode with one failed module, in a failure mode with two failed modules, or in a failure mode with another number of failed modules.

In the module replacement mode, the controller 202 generates module commands to modify the operation of the modules so that one or more modules may be replaced by the user or service personnel. The module to be replaced may be referred to as the replaceable module. While the replaceable module has been disconnected, the other modules continue to operate and supply the output signal of the interleaved inverter.

The controller 202 may detect that the replaceable module should be removed. The controller 202 may detect a change in operation of the replaceable module. The change in operation may be a failure described in other embodiments or another failure. The change in operation may be a partial failure. In one example, one or more components may cause a change in the output of the replaceable module. The controller 202 may detect the partial failure by analyzing the output of the module. For example, the controller 202 may identify one or more electrical characteristics of the output that indicates a module should be replaced.

In another example, for the H-bridge module, an element may fail such that either the first pair of switches or the second pair of switches in the H-bridge module is not providing output. Thus, the replaceable module only produces the positive part of the output waveform or the negative part of the output waveform.

When operating in the module replacement mode, the controller 202 may, if applicable, disconnect the replaceable module and change the phase shifts of the other modules 200 (not the replaceable module) as described herein.

The controller 202 may also provide instructions to the user to remove the replaceable module. For example, the controller 202 may generate a module circuit replacement message for the failure mode of operation while the plurality of module circuits other than the disconnected module circuit continue to operate. The message may be provided to a display or sent through a network to a computer or mobile device. The module circuit replacement message may include an identifier for the module. The module circuit replacement message may include instructions for how to remove the module and/or install a new module. The module circuit replacement message may include specifications (e.g., electrical specifications) needed to order or request the new module.

After the replaceable module is disconnected, the controller 202 performs the phase shift sequence and/or changes the output of the remaining modules, so that the interleaved inverter can continue to operate and provide power to the load even when the replaceable module is not operable (e.g., during replacement or waiting for the new module to be provided).

In one example, the replaceable module is a module in need of maintenance. Example maintenance may include updating firmware in the module, replacement of switching elements, torqueing lugs on conductors, thermal imaging, or another maintenance action or hardware change. The controller 202 may maintain in a memory or database a schedule of maintenance for the modules 200. For example, the modules 200 may experience a scheduled maintenance at a time interval. The time interval may be a calendar interval (e.g., once a year) or based on hours of operation (e.g., number of operating hours). When the scheduled maintenance time occurs for the replaceable module, the controller 202 disconnects the module and performs the phase shift sequence and/or changes the output of the remaining modules so that the interleaved inverter can continue to operate and provide power to the load even when the maintenance is performed. The schedule may also be set and intervals determined by the drive circuit 310 and the timer 304.

In a module sacrificial mode, the controller 202 generates module commands to modify the operation of the modules so that one or more modules may be sacrificed in order to protect the other modules and keep the other modules operating to provide the output signal of the interleaved inverter. For example, electrical surges may occur from external events (e.g., lightening). If an unexpected electrical surge is placed on the output (e.g., through the load), all of the modules 200 in parallel may be damaged. However, if one of the modules 200, designated as the sacrificial module, is configured to receive most (e.g., a predetermined portion) of the electrical surge, the failure may be confined to the sacrificial module.

Consider the example of an overload condition such as an electrical surge on the load for a short amount of time. The electrical surge may last less than a second (e.g., 50 milliseconds, 200 milliseconds or another value between 10-900 milliseconds). The controller 202 may detect the overload condition by detecting a short in one of the modules 200 from analyzing the sensor data for the DC link voltage. Alternatively, the controller 202 may detect the overload condition from a current through one of the inductors 103 (e.g., internal inductors or external inductors). When the inductor current is zero or within a predetermined range of zero, the controller 202 determines that the overload condition is occurring. In addition or in the alternative, the controller 202 may analyze sensor data for the output of the inverter circuit. For example, the controller 202 calculates an amount of ripple in the output signal and monitors the output over a time window. The time window may be from a current time to a past time. When the ripple fluctuates over the time window by a predetermined amount or a predetermined percentage (e.g., 20%, 50%), the controller 202 identifies that the overload condition is occurring.

The controller 202 may select the sacrificial module circuit in response to the external overload condition and operates the sacrificial module circuit to decrease a probability of failure in the other module circuits other than the sacrificial module circuit in response to the detected external overload condition.

The controller 202 is configured to sacrifice one of the modules by sending one or more module commands that instruct the sacrificial module to clamp the output voltage and/or perform a sacrificial setting for the switching elements. In order to clamp the output voltage, the switch may be operated in a linear region by partially enabling the gate on the switches. The clamp may also be performed by causing the switches to operate in a sequence that increased the current through the filter inductor 103 to prevent the output filter element from reaching an excessive voltage condition. As an example: To prevent a DC bus overvoltage condition, all switches in a module may be turned on, such as activating SW1, SW2, SW3 and SW4 of an H-bridge module 100. That is, both the first pair of switches and the second pair of switches are turned on at the same time. The short through the sacrificial module is the lowest resistance path for electrical surge current that would otherwise create an overvoltage condition on the DC link capacitor 109. As a result, the sacrificial module may be damaged by the electrical surge. However, all of the other modules receive much less, or none, of the current from the electrical surge, which protects the other modules. In the time it takes to burn the fuse 101 or otherwise damage the components of the sacrificial module, the sacrificial module will pull enough current from the common capacitor 109 to lower the voltage and protect the other modules.

The selection of the sacrificial module may be performed by a variety of techniques. The sacrificial module may be the oldest module. The controller 202 may record in a database or memory an installation date for the modules. A clock in the controller 202 may generate a timestamp that is stored in response to installation of each of the modules 200. To select the sacrificial module, the controller 202 compares the time stamp and selects the module associated with the oldest timestamp. The selection of the sacrificial module based on time may be performed by the drive circuit 310 and the timer 304.

The sacrificial module may be designated by the controller 202 based on a user input. For example, a dip switch may be set to designate a module as the sacrificial module. As another example the user may select the sacrificial module using a user interface to the controller 202. The controller 202 may detect the presence of the setting and designate the module as the sacrificial module in response to the detection of the setting. The user input may be received and interpreted by the subcircuit for the user input 305 circuit in the drive circuit 310.

The sacrificial module may be designated by the controller 202 based on different hardware included in the sacrificial module. For example, the sacrificial module may include one or more protective elements (e.g., a transient voltage suppressor). The controller may detect the presence of the protective element and designate the module as the sacrificial module in response to the detection of the protective element.

Figure 14:
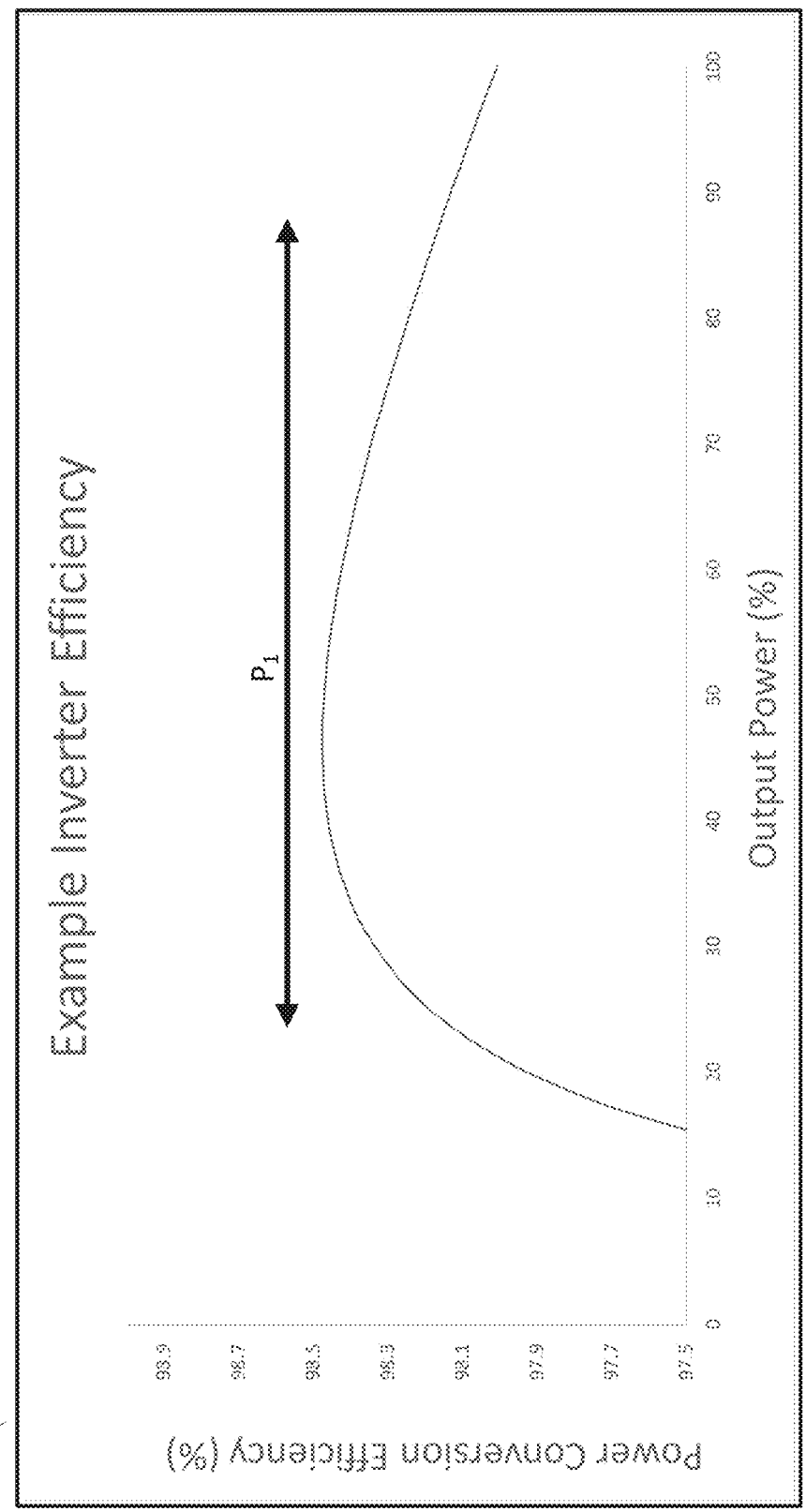
FIG. 14 illustrates an example graph for efficiency of an inverter.

FIG. 14 illustrates an efficiency curve for an example module 200. The module efficiency is low at light loads because the switching losses within the module constitute a large percentage of the system power. The efficiency is lower at high loads because the conduction losses through various elements in the inverter increase non-linearly with increasing output current. The example module 200 has peak efficiency at 50% of rated load and >98% efficiency for loads between 25% and 100% of rated capacity.

When the controller 202 is operating in the peak efficiency mode, the controller 202 generates module commands to modify the operation of the modules so that an optimal number of modules operates to maximize efficiency of the interleaved inverter. In other words, under partial loading conditions, the controller 202 may intentionally disable one or more modules to reduce the switching losses associated with those modules. The controller 202 may then adjust one or more other operating parameters in response to the change in modules in order to keep the interleaved inverter operating at or near peak efficiency with a minimum effect on THD. For example, the controller 202 may adjust the phase between the drive signals to the interleaved modules as described in previous embodiments. The controller 202 may be configured to calculate an efficiency at a given load for each combination of switch modules.

The switch modules in the interleaved inverter may have different size ratings or have different loss characteristic curves. The controller 202 may select the appropriate modules to minimize losses and wear and tear of individual modules under a given load condition. The controller 202 may rotate different modules into operation to verify continued proper operation and to equalize wear between the modules. The controller 202 may intentionally maximize the operating hours on a single module after designating it the sacrificial module. The controller 202 may also have constraints on the minimum number of modules to operate for reasons such as redundancy (failure handling) and THD (due to increased ripple with fewer modules operating).

In an example system with 8 interleaved inverters, each module may have a peak efficiency at 50% of rated load. If the system is operating at 30% of total rated load, the inverter efficiency will be less than optimal with all 8 modules switching. Reducing the number of switching modules from 8 to 5 will increase the total load on each of the modules to 48%, which is much closer to the peak efficiency operating point of the modules. This change in number of modules will reduce wear and tear on some of the modules, while also reducing losses from the inverter, but may increase the current ripple and/or THD on the output of the inverter.

Figure 15:
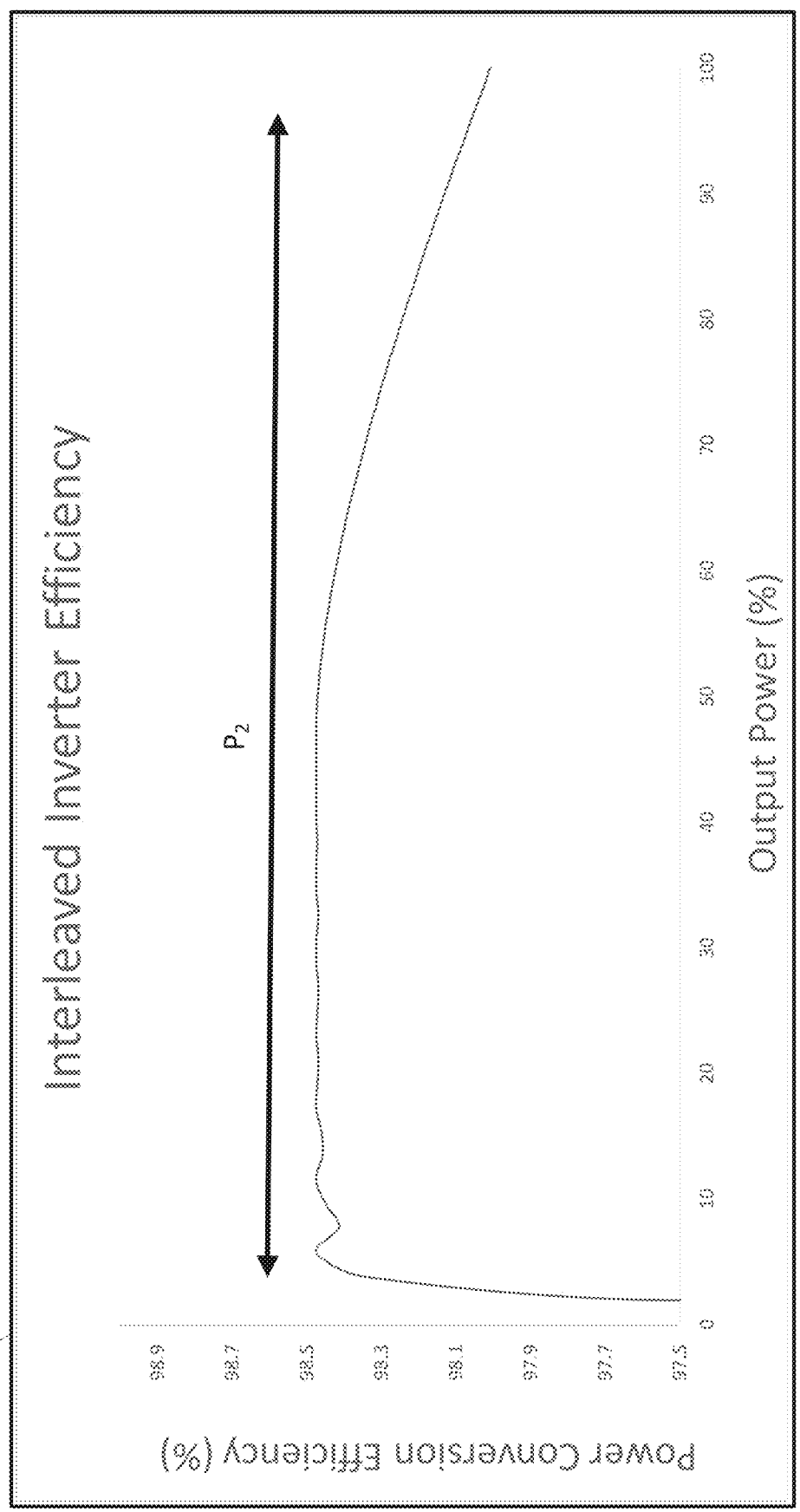
FIG. 15 illustrates another example graph for efficiency of the interleaved inverter.

FIG. 15 Illustrates an aggregate efficiency curve for an interleaved inverter where the THD and current ripple produced by a single module switching is acceptable. The efficiency curve exemplifies the interleaved inverter efficiency with the optimal number of modules switching at each load.

In another example system, the controller 202 may have a minimum target efficiency, determined by a user setting, a measured parameter, such as a temperature, or a measured input with predetermined behavior. In this case, the controller may selectively disable one or more modules, either by disabling the control signal to them or by disconnecting them using the associated switch 311. If the efficiency target is higher than can be achieved at full load, the controller 202 may reduce the output power by shedding downstream load or by adjusting the output current target.

In still another example system with 8 interleaved modules where each module can operate at 33% overload, allowing operation at full load with up to 2 failed modules. The peak efficiency operation mode for controller 202 may require a reduction in the interleaved inverter output power due to a failure of one or more modules, even though the remaining modules are capable of supporting the load when operating in an overload condition. Modules operating in an overload condition may have efficiency below the minimum efficiency, which may result is a reduction in the output power after failure of a module. Similar criteria may be used for THD or current ripple as well. To reduce load, the controller 202 may send a load command to the load 300 to reduce the load based on the reduced total peak efficiency output. If connected to a large power network, such as the utility, the controller may simply reduce the output power by reducing the current output target from the inverter.

In one example, the load command is a load shed command that removes a component of the load to reach the reduced output, either caused by module failure or reduction in output rating due to operating in a peak efficiency mode. This example may be considered a load shedding mode in which the controller 202 generates module commands to modify the operation of the modules so that one or more modules are disconnected and generate a load shed command to reduce one or more load components connected to the interleaved inverter in response to the disconnected module. The load components of the load 300 may be removed or added using breakers that receive breaker actuation commands from the controller 202 or the drive circuit 310.

In addition, the controller 202 may disconnect and/or reconnect modules in response to the load 300. For example, the controller 202 may determine the power level of the load 300 and calculate the number of modules needed to supply the load 300. In one embodiment, the controller 202 may calculate the number of modules operating at the peak efficiency output level that are needed to supply the load 300 at peak efficiency. The controller 202 reduces switching losses by removing modules from operation in light loading scenarios and bringing them back into operation for heavier loading scenarios. In another embodiment, the controller 202 may maintain a minimum number of modules required to supply the load while disconnecting or disabling unnecessary modules to reduce wear and tear on the unnecessary modules.

In the THD reduction mode, the controller 202 generates module commands to modify the operation of the modules so that one or more modules may operate while producing a minimum THD or current ripple. The controller 202 is configured to calculate a first estimated total harmonic distortion value for the normal mode of operation and a second estimated total harmonic distortion value for a case where a reduce number of modules is operating, either due to a module failure, maximum efficiency mode, user intervention, or another reason to be operating with a reduced number of modules.

The controller 202 may generate module commands to increase the switching frequency in order to reduce THD. The controller 202 may generate a load shedding command to add or remove loads in order to reduce THD. In addition, the controller 202 may generate a message to the user as a notification of the THD level. The message may prompt the user for authorization to continue at an increase THD level and otherwise work to minimize the THD until the user authorized increased THD in the output.

The current ripple amplitude often decreases with increasing number of modules connected and/or increases with increasing number of modules that are disconnected. Specifically, equation 4 provides a relationship between a quantity (n) of modules and a total current ripple level ($I_{ripple}$) for an example interleaved inverter with (n) modules having a current ripple level ($I_{module}$). The THD produced by the interleaved inverter often increases with increasing ripple and decreases with decreasing ripple.

$$i_{ripple} = i_{module}/n \qquad \text{Eq. 4}$$

In any of these examples, the controller 202 is configured to return the modules 200 to normal operation. That is, once the module is replaced, as indicated by sensor data indicative of the replacement of the module into the inverter circuit. The sensor data may be generated from a mechanical detector for the physical hardware. The sensor data may be generated by any of the examples described herein. After returning to the normal mode of operation, the controller 202 may adjust a module command to return to the original phase shift value, to adjust a switching frequency for at least one of the plurality of switches, adjust a load shed command to connect or disconnect a load connected to the plurality of modules, or adjust an output level for at least one of the modules. In one example, any of the actions taken by the controller 202 or drive circuit 310 in response to entering the failure mode may be reversed in leaving the failure mode and returning the normal mode.

The controller 202 may operate a control system for the inverter. The control system may operate at a fixed frequency or may operate once per period of each of the switch modules, or may operate as each of the switching modules is operated (a frequency which is the product of the base module frequency and the number of connected modules). The control system may also measure current in each of the output inductors individually, controlling each switch module to prevent damage to modules and to equalize load between the switch modules. Alternatively, the control system may rely on similarities between switching elements in the interleaved inverter to allow control of the total bulk current output from the interleaved modules without individual measurement of the output of each module. This technique may be more desirable on components with positive temperature coefficient relative to losses (such as FETs) which will naturally work to equalize loading between the modules.

A comparison of FIG. 14 and FIG. 15 may illustrate a baseline efficiency (e.g., output power for a power conversion circuit that is not the interleaved inverter) to the efficiency of the interleaved inverter. In the example of FIG. 14, a fully efficient level or maximum efficiency (e.g., 98% in this example) is attainable across an output power range $P_1$ that only span a small range of output power such as 30% to 75% of rated output. However, in the interleaved inverter of FIG. 15 the fully efficient level or maximum efficiency is attainable across an output power range $P_2$ that is much larger such as 5% to 95% of rated output.

Figure 16:
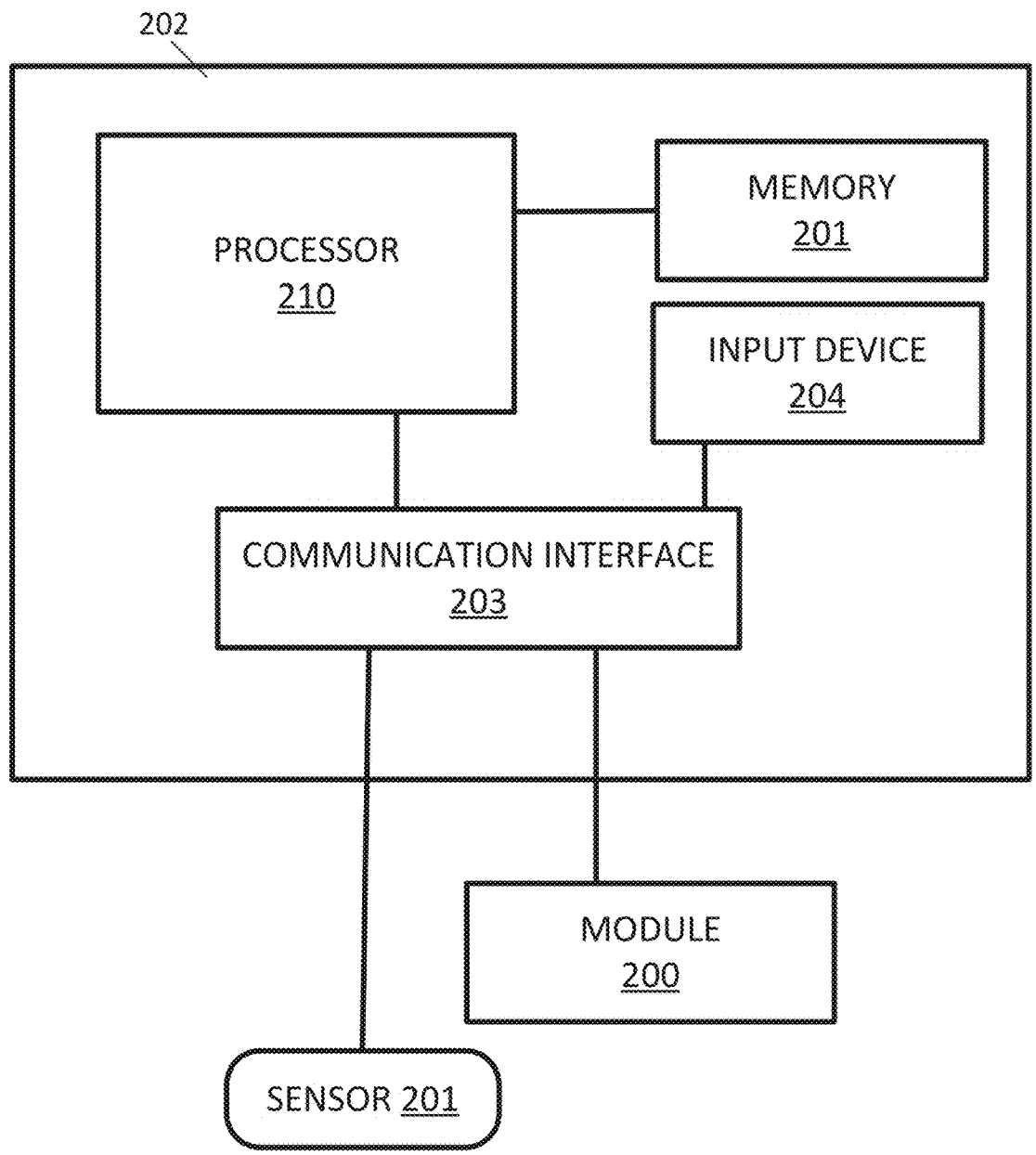
FIG. 16 illustrates an example controller.
Figure 17:
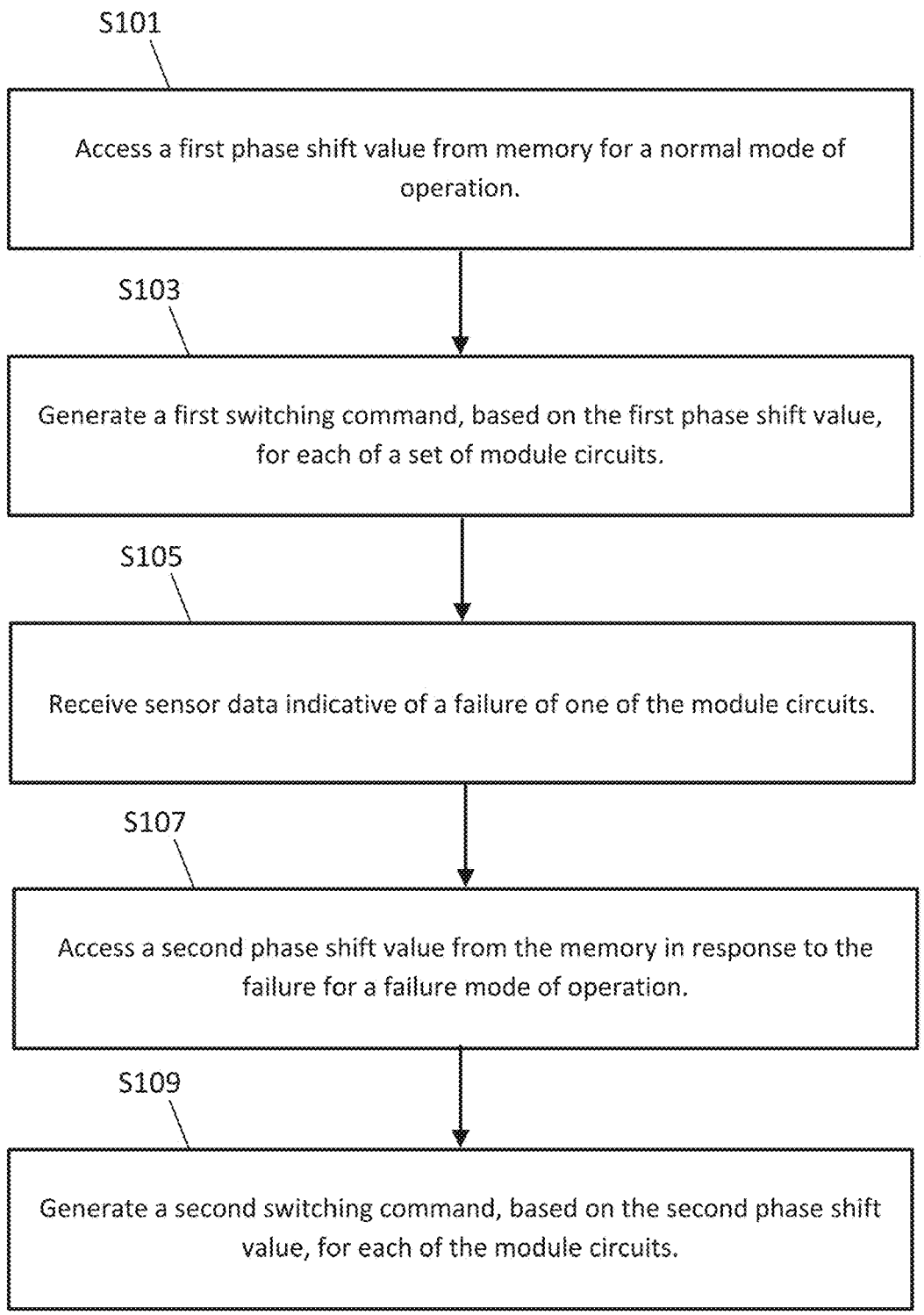
FIG. 17 illustrates an example flow chart for the operation of the controller of FIG. 16.

FIG. 16 illustrates a controller 202 for the systems of FIGS. 8 and 9. The controller 202 may include a processor 210, a memory 211, an input device 204, and a communication interface 203. The communication interface 203 may communicate with one or more sensors such as sensor 201 and one or more switches or modules 200. Additional, different, or fewer components may be included. FIG. 17 illustrates an example flow chart for the operation of the controller of FIG. 16. Additional, different, or fewer acts may be included.

At act S101, the processor 210 accesses a first phase shift value from memory 211 for a normal mode of operation. The memory 211 may include a lookup table that associates different phase shift values with different modes of operation. The processor 210 may include circuitry or a module or an application specific controller as a means for accessing the first phase shift value from memory for the normal mode of operation. The memory 211 is an example means for storing phase shift value in association with modes of operation.

At act S103, the processor 210 generates a first switching command, based on the first phase shift value, for each of a plurality of module circuits. The switching command may include one or more pulse width modulation commands that drive the operation of a switch in the inverter use the first phase shift value. The switching command may include an amplitude value for the output of the module. The switching command may include a frequency for the module output. The processor 210 may include circuitry or a module or an application specific controller as a means for generating a first switching command, based on the first phase shift value, for each of a plurality of module circuits At act S105, the processor 210 receives sensor data indicative of a failure of one of the plurality of module circuits. The processor 210 may include circuitry or a module or an application specific controller as a means for receiving sensor data indicative of a failure of one of the plurality of module circuits. The sensor 201 is an example means for detecting the sensor data indicative of a failure in the plurality of module circuits.

At act S107, the processor 210 accesses accessing a second phase shift value from the memory in response to the failure for a failure mode of operation. The second phase shift value may be accessed from the lookup table in memory 211 described in act S101. The processor 210 may include circuitry or a module or an application specific controller as a means for accessing a second phase shift value from the memory in response to the failure for a failure mode of operation.

At act S109, the processor 210 generates a second switching command, based on the second phase shift value, for each of a plurality of module circuits. The switching command may include the second phase shift value for a new phase difference between modules. The switching command may include an amplitude value for the output of the module. The switching command may include a frequency for the module output.

The processor 210 may include circuitry or a module or an application specific controller as a means for generating a second switching command, based on the second phase shift value, for each of a plurality of module circuits.

The processor 210 may include a general processor, digital signal processor, an application specific integrated circuit (ASIC), field programmable gate array (FPGA), analog circuit, digital circuit, combinations thereof, or other now known or later developed processor capable of processing instructions, solving logic, or calculating value. The processor 210 may be a single device or combinations of devices, such as associated with a network, distributed processing, or cloud computing.

The memory 211 may be a volatile memory or a non-volatile memory. The memory 211 may include one or more of a read only memory (ROM), random access memory (RAM), a flash memory, an electronic erasable program read only memory (EEPROM), or other type of memory. The memory 211 may be removable from the network device, such as a secure digital (SD) memory card.

In addition to ingress ports and egress ports, the communication interface 203 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The input device 204 may include a button, a switch, a key pad, a touchscreen, or other structure configured to allow a user to enter data such as the number of modules included in the interleaved inverter, the preferred output level (e.g., peak efficiency output level) for the modules, the installation date of the modules, the model of the modules, a designation of a sacrificial module, a maintenance date or schedule for the modules, a THD threshold, or another threshold to identify a failure in the module. The input device 204 may receive data for when to enter the failure mode. The input device 204 may receive real time instruction from the user to enable or disable any of the particular or cause the controller 202 to enter a particular mode in response to the instruction entered at the input device 204. The input device 204 may include a connection to a network, a smartphone, a tablet, a personal computer configured to electronically transmit the trigger command to the control system. The communication may be wireless or wired (e.g., received by the communication interface 203).

The battery input source may also be charged by the bidirectional boost converter with power from a utility connected to the output of the interleaved inverter and capable of absorbing or sourcing power. The battery may be selectively charged or discharged based on a used command. The battery charge rate may be adjusted throughout a 24 hours period to minimize the cost of charging by reducing charge current during times when electricity costs are at a maximum. The battery may also be charged by a different input source, such as a genset, a fuel cell, or other input sources.

The fuel cell input source may be part of a larger fuel cell system containing a fuel cell, an engine burning the exhaust from the fuel cell, and an alternator driven by the engine. The combination of the engine and alternator may be referred to as a genset. The interleaved inverter may receive power from multiple sources, such as receiving power from both the fuel cell and the genset. The inverter may draw power from a utility source connected to the output to initiate rotation of the genset using the alternator as a motor.

The genset may include an alternator coupled to an engine. The controller 202 may be combined with a controller for the alternator or the engine. The controller 202 may be an engine control unit (ECU) 100a (or engine control module). The controller may be a generator controller. The controller may be an alternator controller. The controller 202 may be a remote controller. The remote controller may communicate with the genset through a network.

The engine may be any type of engine in which the combustion of a fuel with an oxidizer (e.g., air) in a chamber applies a force to a drive component (e.g., piston, turbine, or another component) of the engine. The drive component rotates or otherwise moves to perform work. The drive component may rotate the crankshaft. A fuel tank stores fuel, which may be provided to the engine from a fuel tank or a fuel line. In one embodiment, the fuel is delivered to a carburetor or mixer. The carburetor or mixer may provide fuel to the cylinders of the engine. In another embodiment, the fuel is delivered by a direction injection system or a fuel injection system.

The ECU is also configured to provide instructions for subsystems of the engine. The ECU receives data from a variety of sensors and provides instructions to other components of the engine. For example, the ECU may receive sensor data from oxygen sensors, air to fuel ratio sensors, a throttle position sensor, and/or a mass air flow sensor. The ECU may calculate fuel injection commands sent to one or more fuel injectors in response to any aspect or combination of aspects of the sensor data. The ECU may receive sensor data from a crankshaft position sensor and calculate idle speed timing in response to the sensor data. The ECU may send instructions for engine timing to the fuel injectors to control fuel injections, the spark plugs to generate sparks for combustion in the cylinders of the engine, or to the valves of the engine to control when combustion sub cycles begin and end.

In addition to dynamically controlling loads, the generator controller may generate instructions at the generator level. The generator level instructions may include messages exchanged with other generators. For example, generator messages may coordinate an order for closing to the bus. The generator messages may include commands sent from genset 10 to another genset. For example, the generator controller may perform a paralleling function with one or more other gensets. For example, when the load is above a threshold the generator controller may generate a paralleling signal to bring an additional generator online. The instruction may cause genset or another generator to close to the bus or begin running. The paralleling signal may include a time value in order to synchronize multiple generators, including setting an order for closing to the bus among the paralleling generators.

In electric power generation, synchronization is the process of matching the amplitude and frequency (in the case of single phase generators) or the amplitude, frequency, and phase order (in the case of multiple phases) of two or more generators connected in a network such as coupled to an electrical grid of a vehicle, a ship, a building or a utility. The generators cannot provide power to the electrical grid unless they are running at substantially the same output and substantially the same speed. More specifically, the two or more generators have substantially the same line voltage, frequency, phase sequence, and phase angle before being connected.

In one example, the interleaved inverter may synchronize to a utility source before connecting to the source. In another example, the interleaved inverter may adjust internal current and voltage targets to match that of the utility after the utility is connected to the output, synchronizing after closure as opposed to synchronizing before closure.

By way of comparison. the following procedure may be used for connecting two generators to a bus. First, the first generator is connected to the bus. Next, the other generator is brought up to speed. The speed may be the known synchronous speed of the first generator or based on a measurement from the electrical grid. After energizing the field of the second generator, the output is tested. The output of the second generator is measured and the phase is adjusted to match that of the electrical grid or the first generator. When the match is sufficient, the second generator is connected to the bus. Alternatively, to communicate the output between generators, the generators may exchange messages including a zero crossing message, a synchronization message, a closing timing message. The messages may be relayed in a variety of techniques including analog signals, digital signals, and data packets that are switched on a network or directly transferred between the generators.

In addition to dynamically controlling loads, the alternator controller may generate instructions internal to the alternator. For example, the alternator controller may control an electrical parameter of the output of the alternator. In one representation, the alternator includes of a rotor and a stator. The rotor has a field winding, which may be a series wound coil on a magnetically permeable core. The rotor may freely rotate within a stator, about a concentric axis. The stator consists of armature windings; these are sinusoidally distributed coils placed on the interior of a stack of ringed laminations. The laminations include slots for the placement of the armature windings. The clearance between the freely rotating rotor and the stationary stator is denoted as the air gap. The function of the synchronous alternator is to convert mechanical power from a driving mechanism into electrical power. The driving mechanism is denoted as the prime mover (e.g. internal combustion engine) and provides torque to the rotor. Electrical power is drawn from terminals crimped on to the ends of the armature windings. In order to convert mechanical power to electrical power, there is magnetic coupling between the rotor and stator.

The alternator controller may receive sensor data from one or more sensors and in response, generate one or more alternator commands. The sensor data may be a measurement of an electrical parameter of the exciter armature or the field coil. The electrical parameter may include a current, a voltage, or a resistance. The electrical parameter may be a flux induced on the field coil assembly by a current in the armature windings. In this way, the sensor data may be indicative of an output of the generator. Further, because a load on the generator impacts the current in the armature windings, the sensor data may be indicative of the load on the generator. The sensor data may be temperature data, which may indicate the resistance of the field coils or armature windings.

The alternator controller may perform an analysis of one or more components of the sensor data at the controller. For example, the alternator controller may compare a value in the sensor data to a threshold. The alternator controller may sort, average, or filter the sensor data. The alternator controller may remove outlier values from the sensor data. The alternator controller may calculate a moving average of the sensor data. The alternator controller may query a lookup table using the sensor data. The alternator controller generates an alternator command at the alternator controller based on the sensor data. The generator command may be an adjustment in a current in the field winding of the rotor, which directly affects the output of the generator. For example, the alternator controller may compare an estimated output voltage or current of the generator to a threshold. When the output falls below a low threshold, the alternator controller increases the current of the field windings. When the output exceeds a high threshold, the alternator controller decreases the current of the field windings. The alternator command may adjust a speed of an engine driving the rotor of the generator. For example, the alternator controller may compare an estimated output frequency of the generator to a threshold. When the output frequency falls below a low threshold, the alternator controller increases the speed of the engine. When the output frequency exceeds a high threshold, the alternator controller decreases the speed of the engine. The alternator controller may also identify an anomaly from the sensor data and generate a command to shut down the genset or issue a warning to the user.

The communication may occur on a dedicated communication wire that extends between the generator controllers (e.g., serial cable, USB cable). The communication may occur over a wired computer network (e.g., Ethernet). The communication may be modulated to be transmitted over bus. In this example another communication path may be provided by the gensets and the bus that bypasses the breaker. The communication may occur wirelessly such as a cellular network, the family of protocols known as Wi-Fi or IEEE 802.11, the family of protocols known as Bluetooth, or another protocol. Example wireless networks may include a wireless mesh network (e.g., Bluetooth mesh). The wireless mesh network many include many to many communication.

While the computer-readable medium (e.g., memory 211) is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An interleaved inverter comprising:
   a plurality of module circuits including a plurality of switches; and
   an inverter controller configured to assign a first phase shift value to each of the plurality of module circuits during a normal mode of operation and assign a second phase shift value to at least one of the plurality of module circuits during an alternate mode of operation, wherein the second phase shift value is greater than the first phase shift value, wherein the second phase shift value is calculated based on the first phase shift value, a total quantity of the plurality of module circuits and a failed number of the plurality of module circuits, wherein the inverter controller is configured to calculate a first peak efficiency power rating for the normal mode of operation and a second peak efficiency power rating for the alternate mode of operation.

2. The interleaved inverter of claim 1, further comprising:
an electrical isolator coupled between a direct current (DC) bus and at least one of the plurality of module circuits, wherein the electrical isolator is configured to disconnect the at least one of the plurality of module circuits.

3. The interleaved inverter of claim 1, further comprising:
a common filter element coupled to each of the plurality of module circuits and configured to reduce electrical ripple output from the module circuit.

4. The interleaved inverter of claim 3, wherein the common filter element includes a common capacitor electrically coupled to each of the plurality of module circuits.

5. The interleaved inverter of claim 4, wherein the common filter element is a DC Link capacitor for a DC bus or an alternating current (AC) output capacitor.

6. The interleaved inverter of claim 3, further comprising:
a module filter element for each of the plurality of module circuits coupled to a first terminal of the common filter element.

7. The interleaved inverter of claim 1, wherein the controller is configured to select a timing control for the plurality of switches in response to the first phase shift value.

8. The interleaved inverter of claim 1, further comprising:
a sensor configured to generate sensor data for an electrical parameter of at least one of the plurality of module circuits, wherein the controller is configured to receive the sensor data and detect a failure or a disconnection of at least one of the plurality of module circuits.

9. The interleaved inverter of claim 8, wherein the controller disconnects the at least one of the plurality of module circuits in response to the detected failure.

10. The interleaved inverter of claim 8, wherein the second phase shift value is assigned to the other module circuits of the plurality of module circuit in correspondence with the disconnected module circuit.

11. The interleaved inverter of claim 1, wherein the controller selects a sacrificial module circuit in response to an external overload condition and operates the sacrificial module circuit to decrease a probability of failure in the plurality of module circuits other than the sacrificial module circuit in response to the detected external overload condition.

12. The interleaved inverter of claim 1, wherein the controller provides a module circuit replacement message for the alternate mode of operation while the plurality of module circuits other than the disconnected module circuit continue to operate.

13. The interleaved inverter of claim 1, wherein the inverter controller is configured to detect a replacement module circuit and, in response to the detected replacement module circuit, reassign the first phase shift value to a modified plurality of module circuits including the replacement module circuit according to the normal mode of operation.

14. The interleaved inverter of claim 1, wherein the inverter controller is configured to calculate a first estimated total harmonic distortion value for the normal mode of operation and a second estimated total harmonic distortion value for the alternate mode of operation.

15. The interleaved inverter of claim 1, wherein the inverter controller is configured to generate, in response to the alternate mode of operation, a module command to adjust a switching frequency for at least one of the plurality of switches, a load shed command to connect or disconnect a load connected to the plurality of module circuits, or an output level for at least one of the plurality of module circuit.

16. The interleaved inverter of claim 1, wherein the inverter controller is configured to generate a first pulse width modulation signal for the normal mode of operation and a second pulse width modulation signal for the alternate mode of operation.

17. An interleaved inverter comprising:
a plurality of module circuits including a plurality of switches; and
an inverter controller configured to assign a first phase shift value to each of the plurality of module circuits during a normal mode of operation and assign a second phase shift value to at least one of the plurality of module circuits during an alternate mode of operation, wherein the second phase shift value is greater than the first phase shift value,
wherein the second phase shift value is calculated based on the first phase shift value, a total quantity of the plurality of module circuits and a failed number of the plurality of module circuits,
wherein the inverter controller is configured to calculate a first estimated total harmonic distortion value for the normal mode of operation and a second estimated total harmonic distortion value for the alternate mode of operation.

18. An interleaved inverter comprising:
a plurality of module circuits including a plurality of switches; and
an inverter controller configured to assign a first phase shift value to each of the plurality of module circuits during a normal mode of operation and assign a second phase shift value to at least one of the plurality of module circuits during an alternate mode of operation, wherein the second phase shift value is greater than the first phase shift value,
wherein the second phase shift value is calculated based on the first phase shift value, a total quantity of the plurality of module circuits and a failed number of the plurality of module circuits,
wherein the inverter controller is configured to generate, in response to the alternate mode of operation, a module command to adjust a switching frequency for at least one of the plurality of switches, a load shed command to connect or disconnect a load connected to the plurality of module circuits, or an output level for at least one of the plurality of module circuit.

* * * * *